(12) United States Patent
Black et al.

(10) Patent No.: US 8,897,188 B2
(45) Date of Patent: Nov. 25, 2014

(54) METHOD AND APPARATUS FOR DISCONTINUOUS RECEPTION IN USER EQUIPMENT FOR POWER SAVINGS

(75) Inventors: Peter John Black, San Diego, CA (US); Yin Huang, Beijing (CN); Mingxi Fan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 61 days.

(21) Appl. No.: 13/423,522

(22) Filed: Mar. 19, 2012

(65) Prior Publication Data
US 2013/0242826 A1 Sep. 19, 2013

(51) Int. Cl.
G08C 17/00 (2006.01)
H04W 52/02 (2009.01)

(52) U.S. Cl.
CPC .......... H04W 52/0267 (2013.01); H04W 52/02 (2013.01)
USPC ......................................................... 370/311

(58) Field of Classification Search
CPC ...................................... H04W 52/02–52/0296
USPC ............ 370/310, 311; 455/343.1–343.5, 574, 455/127.5, 13.4, 522
See application file for complete search history.

(56) References Cited

U.S. PATENT DOCUMENTS

| | | | | |
|---|---|---|---|---|
| 5,109,530 | A * | 4/1992 | Stengel | 340/7.33 |
| 5,487,180 | A * | 1/1996 | Ohtake | 455/522 |
| 5,542,117 | A * | 7/1996 | Hendricks et al. | 455/343.4 |
| 2002/0082039 | A1* | 6/2002 | Ue et al. | 455/522 |
| 2005/0113087 | A1* | 5/2005 | Rick et al. | 455/434 |
| 2005/0215226 | A1* | 9/2005 | Tahtinen | 455/343.1 |
| 2007/0184836 | A1* | 8/2007 | HC | 455/434 |
| 2007/0259699 | A1* | 11/2007 | Homchaudhuri | 455/574 |
| 2008/0003965 | A1* | 1/2008 | Saily et al. | 455/226.2 |
| 2011/0053542 | A1* | 3/2011 | Jin et al. | 455/234.2 |
| 2012/0281675 | A1 | 11/2012 | Liang et al. | |

FOREIGN PATENT DOCUMENTS

WO 2011063568 A1 6/2011

OTHER PUBLICATIONS

International Search Report and Written Opinion—PCT/US2013/033023—ISA/EPO—Jun. 26, 2013.

* cited by examiner

*Primary Examiner* — Ricky Ngo
*Assistant Examiner* — Kabir Jahangir
(74) *Attorney, Agent, or Firm* — Darren M. Simon

(57) ABSTRACT

Methods and apparatuses to power off a modem receiver or components of the receiver at a time prior to the end of the frame based on data in the frame being received and properly decoded before the end of the frame. In an aspect, the apparatuses and methods provide power saving in a wireless device, and include receiving data within a frame at a user equipment, determining whether all payload packet data has been correctly decoded prior to an end of the frame, and powering down a receiver component for a portion of a remainder of the frame in response to determining that all payload packet data has been correctly decoded and where a first time period to a next scheduled overhead bit transmission period of a slot in the frame is greater than a second time period corresponding to a warm-up period for the receiver component.

28 Claims, 19 Drawing Sheets

METHOD AND APPARATUS FOR DISCONTINUOUS RECEPTION IN USER EQUIPMENT FOR POWER SAVINGS

BACKGROUND

1. Field

Aspects of the present disclosure relate generally to wireless communication systems, and more particularly, to power management of a wireless device receiver or modem.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

Furthermore, battery life has become a chief concern of consumers wishing to purchase a mobile device that utilizes any of the above technology types. As a result, it has become imperative to designers that power is conserved whenever possible to maximize the life of the mobile device battery. One component that may cause a substantial drain in battery life is a mobile device receiver and its corresponding circuitry. Currently, many mobile device receivers provide power to all internal receiver components for an entire data receiving timeframe. For example, in UMTS, a full receiving interval may be 20 ms for a frame. Typically, modem receiver components are powered on throughout the entire 20 ms interval to ensure that all received data is able to be decoded, regardless of when in the interval the data may be successfully received or decoded. Therefore, typical mobile devices may unnecessarily use battery power when receiving a frame.

Thus, methods and apparatuses are needed to provide battery savings for mobile devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure presents aspects of a method of saving power in a wireless device, which includes receiving data within a frame at a user equipment (UE), determining whether all payload packet data has been correctly decoded prior to an end of the frame, and powering down a receiver component for a portion of a remainder of the frame in response to determining that all payload packet data has been correctly decoded and where a first time period to a next scheduled overhead bit transmission period of a slot in the frame is greater than a second time period corresponding to a warm-up period for the receiver component.

Additionally, the present disclosure describes an apparatus for wireless communication, which includes means for receiving data within a frame at a user equipment, means for determining whether all payload packet data has been correctly decoded prior to an end of the frame; and means for powering down a receiver component for a portion of a remainder of the frame in response to the means for determining making a determination that all payload packet data has been correctly decoded and where a first time period to a next scheduled overhead bit transmission period of a slot in the frame is greater than a second time period corresponding to a warm-up period for the receiver component.

Furthermore, the present disclosure describes a computer program product, including a computer-readable medium comprising code for receiving data within a frame at a user equipment, determining whether all payload packet data has been correctly decoded prior to an end of the frame, and powering down a receiver component for a portion of a remainder of the frame in response to determining that all payload packet data has been correctly decoded and where a first time period to a next scheduled overhead bit transmission period of a slot in the frame is greater than a second time period corresponding to a warm-up period for the receiver component.

Moreover, described herein is an apparatus for wireless communication, which includes at least one processor and a memory coupled to the at least one processor, wherein the at least one processor is configured to receive data within a frame at a user equipment, determine whether all payload packet data has been correctly decoded prior to an end of the frame, and power down a receiver component for a portion of a remainder of the frame in response to determining that all payload packet data has been correctly decoded and where a first time period to a next scheduled overhead bit transmission period of a slot in the frame is greater than a second time period corresponding to a warm-up period for the receiver component.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents. These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present aspects relate to methods and apparatuses to power off a modem receiver or components of the receiver at a time prior to the end of the frame, e.g. prior to the end of a voice frame, such as a 20 ms frame, based on the data being received and properly decoded before the end of the frame. The received data packets will often include a Cyclic Redundancy Check (CRC), which, if it passes at the receiver, ensures that the data has been properly received. Therefore, in the present aspects, if a CRC passes "early" (e.g., at 10 ms or some other shortened interval before the end of the frame), which means that all data from the full frame, e.g. a 20 ms transmission frame, has been properly received at that "early" time, the receiver can gate off power to one or more receiver components for the remainder of the data transmission frame in order to save power in the receiver.

The receiver may also periodically wake up to receive signals related to power control maintenance (e.g., dedicated pilot (DP) data and transmit power control (TPC) data). Because the timing associated with receiving DP and TPC bits is cyclic and known by the receiver, the receiver can wake periodically from a powered-off state to receive these overhead control messages. Therefore, the present aspects further contemplate a method and apparatus for a receiver to periodically wake from a powered-off state to receive the cyclic DP and TPC bits. Additionally, in WCDMA systems, information may be broadcast over a dedicated control channel (DCCH) during a longer transmission interval, such as a 40 ms interval. Aspects of the described apparatuses and methods may configure a receiver, or components thereof, to accommodate the DCCH transmissions, such as by prohibiting an early power down.

Figure 1:
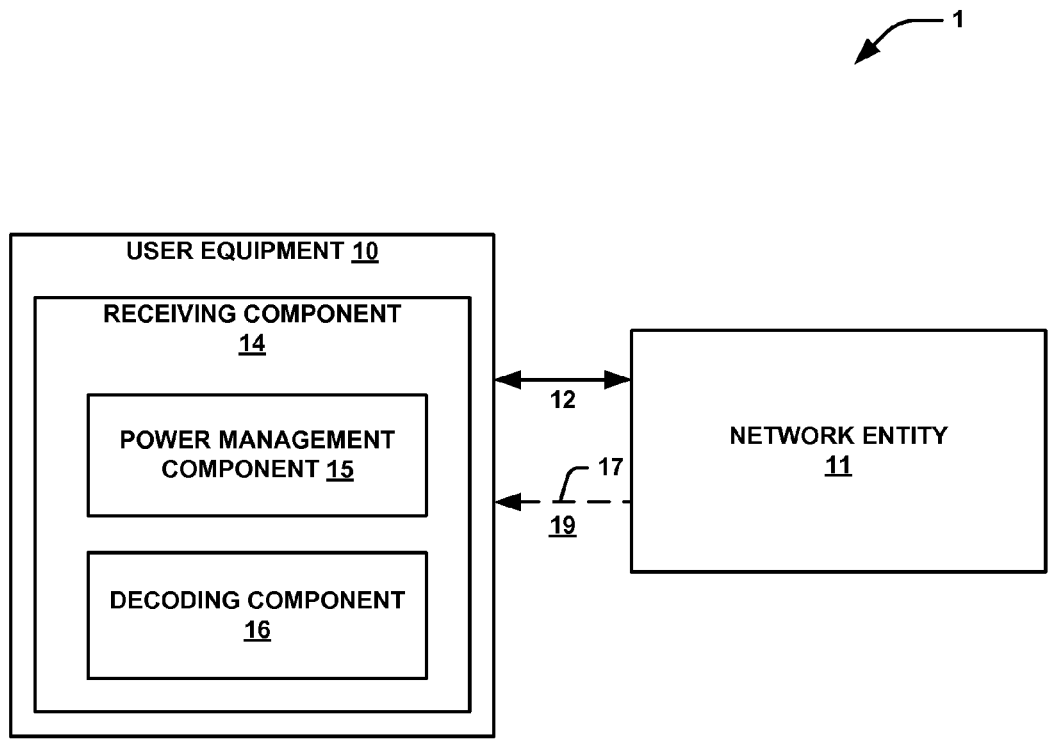
FIG. 1 is a block diagram illustrating a wireless environment according to aspects of the present disclosure.

FIG. 1 is a block diagram illustrating an example wireless environment 1, which may include one or more network entities 11 and one or more user equipment (UE) 10, which may be communicatively connected by one or more communication links 12. In an aspect, UE 10 may receive a signal 17 including data 19, such as packet data and/or control data, at a receiving component 14 via communication link 12 from network entity 11. Receiving component 14 may be configured to receive signals, including signal 17, from and/or send signals to network entity 11. For example, receiving component 14 may be configured to receive one or more data or overhead messages from the network entity 11. In a further aspect, receiving component 14 may be a component in a modem or other component in UE 10.

Furthermore, receiving component 14 may include a decoding component 16, which may be configured to decode one or more signals 17 from network entity 11. In an aspect, UE 10 and network entity 11 may communicate via one or more technologies that specify one or more frame lengths and one or more time slots in the frame in which control data is to be received and decoded by decoding component 16. For example, a 20 ms frame may be divided into a plurality of slots, which may be further divided into overhead data (e.g. control data) receiving intervals and packet data receiving intervals (e.g. package data unit (PDU) and/or service data unit (SDU) receiving intervals). In an aspect, overhead data may include dedicated pilot (DP) data and transmit power control (TPC) data. DP data may provide energy estimates used to maintain downlink power control to the UE 10 from the network entity 11, whereas TPC data may include power control bits used to maintain uplink power control from the UE 10 to the network entity 11. In an aspect, DP data may be received in a first overhead data interval, whereas TPC data may be received in a separate second overhead data interval in each slot. As such, decoding component 16 may obtain signal 17, or a portion thereof such as a frame, and execute a decoding algorithm, e.g. which corresponds to an encoding algorithm with which signal 17 was encoded, in order to obtain the data within signal 17. Moreover, decoding component 16 may execute one or more integrity algorithms, such as but not limited to a cyclic redundancy check (CRC), to determine whether data 19, such as all payload packet data, has been correctly decoded. In some aspects, decoding component 16 may complete execution of the one or more integrity algorithms prior to an end of the frame.

In addition, receiving component 14 may include a power management component 15, which may be configured to control power to one or more components in receiving component 14. For example, power management component 15 may control power levels of a phase lock loop (PLL) component and corresponding circuitry in receiving component 14 based on an integrity state of received and decoded signals, such as signal 17 or a portion thereof such as a frame. For instance, in some aspects, power management component 15 may perform and "early," e.g. for a portion of a remainder of the frame, power down of one or more component of receiving component 14 in response to determining that all payload packet data has been correctly decoded. In an aspect, power management component 15 may perform the "early" power down when a first time period to a next scheduled overhead bit transmission period of a slot in the frame is greater than a second time period corresponding to a warm-up period for the receiver component. Moreover, power management component 15 may take into account warm up periods, in addition to overhead data transmission periods and a correct decoding determination, when determining whether to power down and/or power up one of more components of receiver component 14.

Figure 2:
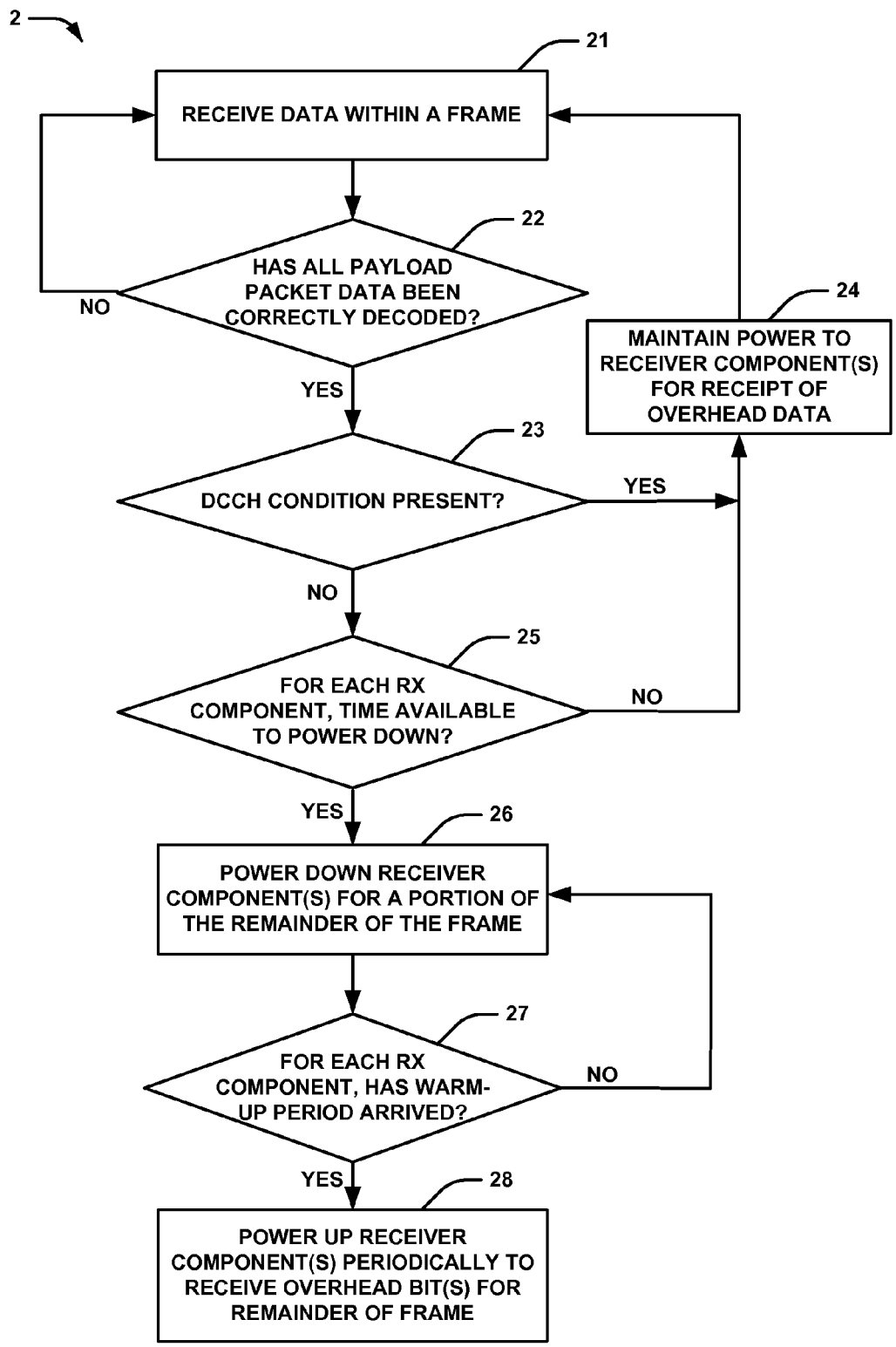
FIG. 2 is a flowchart illustrating aspects of a method for mobile device battery savings according to the present disclosure.

Thus, the described apparatuses and methods, through execution of power management component 15, may provide UE 10 with power savings by avoiding unnecessarily battery power usage when receiving signal 17 or a portion thereof, such as a frame. Turning to FIG. 2, illustrated are aspects of a method 2 for maximizing battery power in a mobile device or UE provided in the present disclosure. In an aspect, a UE (e.g. UE 10, FIG. 1) may receive data within a frame at block 21, wherein the data may be received from a network entity (e.g. network entity 11, FIG. 1). Once the data has been received, at block 22, the UE may determine whether all payload packet data has been correctly decoded at block 22. In some aspects, frame packet data may include packet data unit (PDU) and/or service data unit (SDU) data, which may be distinguished from overhead bit data and/or control data. In a further aspect, the UE may determine whether all payload packet data has been correctly decoded by determining whether a CRC on the received data passes, though any form of data integrity or reliability test may be used by the UE to determine that all payload packet data has been correctly received. Where not all payload packet data has been correctly decoded, the UE may maintain power to a receiving component to enable the UE to continue receiving data within the frame, for example, at block 21.

Conversely, where the UE determines that all payload packet data has been correctly decoded at block 22, the UE may further determine whether a DCCH condition is present at block 23. Where a DCCH condition is present, communication protocols and scheduling may diverge from those typically used for packet data transmission. For example, DCCH frames may span 40 ms, where traditional packet data transfer frames are 20 ms in length. Therefore, early power-down of components may be avoided according to aspects of the present disclosure, because to perform early power-down of components in a DCCH condition may lead to loss of substantial amounts of overhead/control data. Additionally, further aspects of block 23 are presented below in connection with FIG. 3.

Where the UE determines that a DCCH condition is present at block 23, the UE may maintain power to the receiver components for receipt of overhead data at block 24. Alternatively, where the UE determines that a DCCH condition is not present at block 23, the UE may determine, for each receiver component, whether there is time available to power down the component before a required power-up period at block 25. In an aspect, a UE may contain one or more components that require a warm-up period before the components may properly receive signals and one or more components that require a negligible warm-up period to properly receive signals. Therefore, at block 25, the UE may determine, based on the warm-up period required for each receiver component, whether each receiver component can be powered down before properly receiving bits. In other words, where a receiver component requires a warm-up time greater than or equal to the length of time until the next scheduled overhead bit transmission time, the UE may keep the receiver component powered on to receive overhead data at block 24. Alternatively, where the required warm-up time is less than the length of time until the next scheduled overhead bit transmission time, the UE may power down that component for a portion of the remainder of the frame at block 26.

Furthermore, at block 27, the UE may determine for each receiver component whether the warm-up period required for the receiver component, which may be substantially negligible or may be non-negligible, has arrived. Where the warm-up period for that receiver component has not arrived, the UE may keep the receiver component powered down, for example, at block 26. Alternatively, where the warm-up time for the receiver component has arrived at block 27, the UE may power up the receiver component to receive, for example, overhead bits at block 28. Additionally, at block 28, the UE may continue to power up the receiver component based on scheduled overhead bit transmission period(s) for the remainder of the frame. As such, UE battery power may be conserved.

For example, one or more receiver components may demand a warm-up period before the components may function properly. In one aspect, such a component may be a phase-locked loop component, though such a component may be any receiver component in the UE. Therefore, to allow a buffer period for such a component to warm up, at block 25 the UE may determine whether a first time period corresponding to a time period until the next scheduled overhead bit transmission period of a slot in the frame is greater than a second time period, which may correspond to a warm-up period for the receiver component. Alternatively, in some aspects, the second time period may correspond to substantially twice the length of the warm-up period for the receiver component, or any multiple of the warm-up period. By extending the second time period to substantially twice the length of the warm-up period for the receiver component, the UE may be highly confident that the receiver component is fully warmed-up and functional by the time the next scheduled overhead bit transmission period arrives.

When the UE executing method 2 at block 25 determines that the second time period is greater than or equal to the first time period, then at block 26 the UE may maintain power to one or more receiver components in such an instance, depending on factors that will be discussed below in the context of FIG. 4. For example, the UE executing this method may maintain power in order to avoid missing overhead bit data transmitted during the next scheduled overhead bit transmission period, e.g. if the UE were to power down a receiver component that required more warm-up time than was available before the next scheduled overhead bit transmission period.

When the UE executing method 2 at block 25 determines that the first time period is greater than the second time period, then at block 27 the UE may power down one or more receiver components for a portion of the remainder of the frame. In an aspect, such a portion of the remainder of the frame may last until the beginning of a required warm-up period before a next scheduled overhead bit transmission period. Alternatively, where one or more receiver components do not require a warm-up period, the portion of the remainder of the frame may last until the beginning of the next scheduled overhead bit period. Therefore, by powering down the one or more receiver components until the next scheduled overhead bit period, the UE may save battery power while ensuring that required overhead bits are received during scheduled overhead bit transmission periods. Optionally, at block 28, method 2 may continue with additional methods, such as method 3 of FIG. 3 and/or method 5 of FIG. 5.

Figure 3:
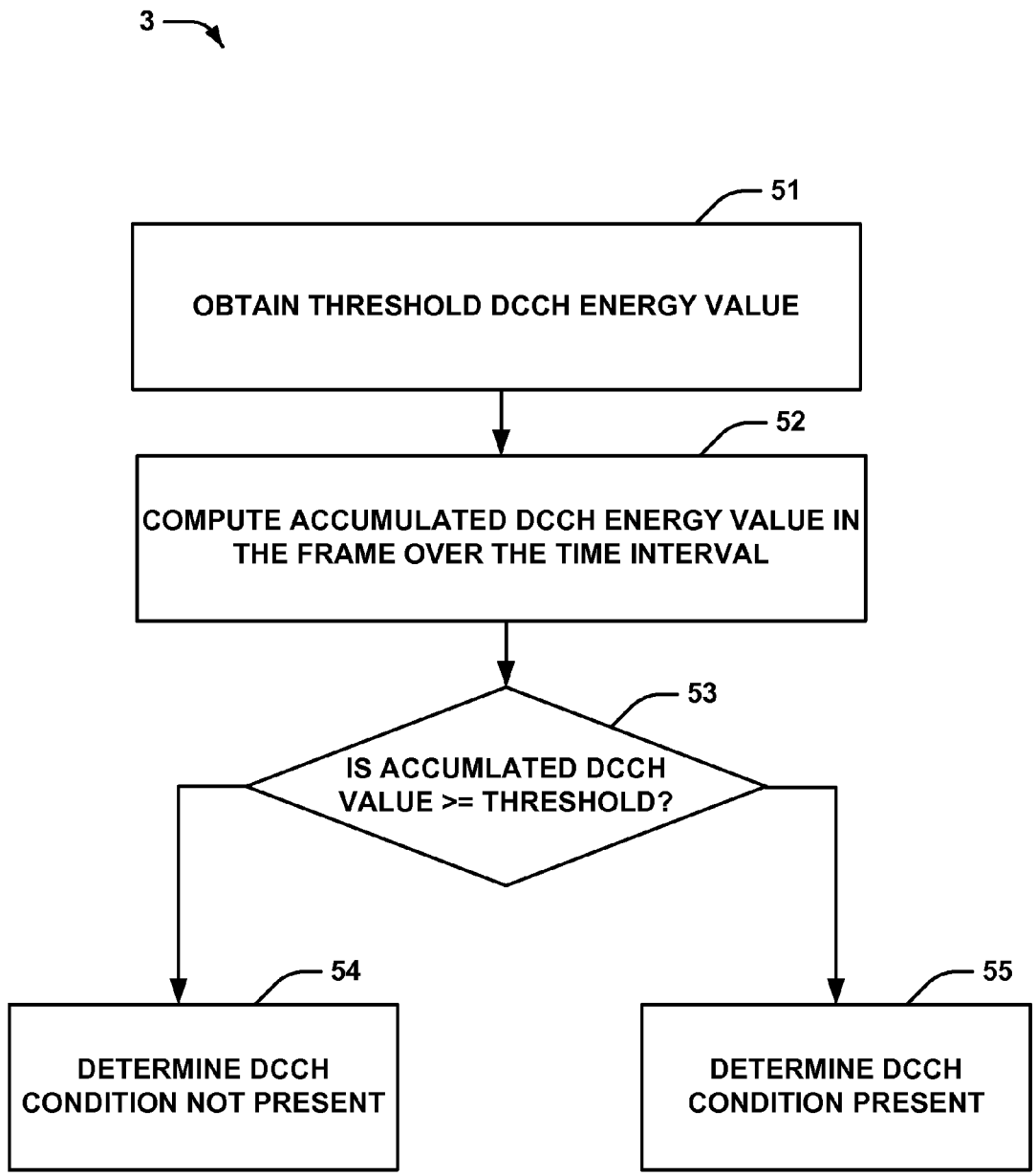
FIG. 3 is a flowchart illustrating aspects of a method for mobile device battery savings where a DCCH condition is encountered according to the present disclosure.

FIG. 3 illustrates aspects of a detailed illustration of block 23 for determining whether a dedicated control channel (DCCH) condition is present in methods Turning to FIG. 3, a scenario applicable to W-CDMA and other communication technologies is presented. In W-CDMA, there exist multiple types of data frames: (1) traffic frames (DTCH) and (2) overhead signaling frames (DCCH). In WCDMA, there is no way to know whether a particular received transmission is traffic or overhead signaling data. Adding a further complication, DCCH is transmitted over a 40 ms frame instead of a 20 ms frame. Therefore, if the receiver or one or more receiver components are powered off after a shortened interval prior to the end of a frame (e.g. a 10 ms interval) there is only 25% reliability that all of the DCCH bits have been received.

Furthermore, DCCH signaling data has no packet indicator bits, unlike traditional data bits, which may include Cyclic Redundancy Check (CRC) bits. In some instances, however, the DTCH traffic bits may include CRC bits and the DTCH bits may be broadcast with the DCCH bits as multicast traffic. In such a situation, in some described aspects, the receiver may assume that the DCCH bits are correctly received if the DTCH CRC passes. Thus, early receiver power off can be performed with this assumption.

Alternatively or additionally, detection of DCCH traffic can be performed based on thresholding. Using this method, if a threshold energy value related to the DCCH during an interval is not reached, then the absence of DCCH during that interval can be assumed and the receiver may power down for the remainder of the frame with some confidence that DCCH data is not being missed. For example, the receiver may use an accumulated DP and TPC energy within a shortened subframe (e.g. a 10 ms subframe) as a reference energy level. In block 23 of FIG. 2, if an accumulated DCCH energy level over this same time period is lower than this reference energy level by a particular threshold value, then an absence of DCCH data can be declared and the receiver may power down completely or may power down some of its components.

Specifically, turning to block 51, a UE may obtain a threshold DCCH energy value. In an aspect, the UE may obtain this threshold DCCH energy value from a network component in a transmission or may obtain the value from pre-configured memory on the UE. Alternatively or additionally, a user or network administrator may set the threshold DCCH value in, for example, a user interface on the UE. Furthermore, in an aspect, the threshold DCCH energy value may correspond to an accumulated dedicated pilot (DP) data and transmit power control (TPC) data energy received within a reference frame sub-period, which, for example, may be a 10 ms time period. Additionally, at block 52, the UE may compute an accumulated DCCH energy value that has been received by the UE in the frame over a sampling time interval. Next, at block 53, the UE may compare the accumulated DCCH energy value to the threshold DCCH energy value. Where the accumulated DCCH energy value is lower than the threshold DCCH energy value, then the absence of a DCCH may be declared at block 54. Alternatively or additionally, the comparing may take into account a buffer threshold below the DCCH energy threshold. In such an aspect, where the accumulated energy is lower than the threshold DCCH energy value by at least the buffer threshold, the absence of DCCH can be declared as in block 54. Thus, by implementing the buffer threshold, the UE may declare the absence of a DCCH with greater confidence.

In a further aspect, at block 55, where the accumulated DCCH energy value is greater than or equal to the DCCH energy threshold (or the threshold minus the buffer threshold as above), the UE may declare the presence of a DCCH and/or communication according to a DCCH standard (e.g. 40 ms frame length) at block 55

In another aspect of the present invention, data that is comprised of more than one type or class of frame may be communicated to the UE 10, which may base a decision to power down one or more receiver components receiving all classes of data based on correct receipt of one of the classes. For example, in a specific example of this aspect, the data transmitted is comprised of voice data coded to correspond with the Adaptive Multi-Rate (AMR) 12.2 k coding standard. The voice data in AMR 12.2 k is sent to the physical layer in three classes: A, B, and C, where each class has a specified level of required reliability. Each class of data may be sent in different streams because they may individually tolerate different error rates. In AMR 12.2 k voice data, for example, CRC data is only added to class A data. In the present aspect, the receiver may assume that the class B and/or class C data has been correctly received if the CRC associated with the frame's class A data passes, for example, at block 22 of FIG. 2. Therefore, if the CRC or the class A passes in a shorter interval than the typical 20 ms frame (e.g., a 10 ms shortened interval), the receiver may choose to power down all or some of its components for the remainder of the frame to save power. Alternatively, the AMR 12.2 data may be comprised of full rate, SID, and null rate frames. Also applicable are AMR 7.9 kbps and AMR 5.9 kbps standards for UMTS.

To further illustrate aspects of the present disclosure, FIGS. 4-12 present waveform diagrams according to aspects of methods described herein, such as, but not limited to the methods described in relation to FIGS. 2 AND 3. Each of the FIGS. 6-14 include a frame schedule according to two example slots in an example data transmission frame, which are indicated above the frame schedule. The frame schedule delineates several sub-periods in each slot, which, in the example slots (slot 1 and slot 2) include a first overhead bit transmission sub-period OH 1, a first data transmission sub-period DATA 1, a second overhead bit transmission sub-period OH 2, and a second data transmission sub-period DATA 2. In an aspect, control data, such as dedicated pilot (DP) information and transmit power control (TPC) information may be transmitted and/or received or may be scheduled to be transmitted and/or received during one or both of OH 1 and OH 2.

Additionally illustrated in FIGS. 4-12 are power waveforms representing a power on state or a power off state of one or more receiver components, such as, but not limited a first receiver component (Component 1), which may have a warm-up period, and a second receiver component (Component 2), which may have essentially no warm-up period, e.g. a warm-up period equal to zero or a substantially negligible value. In some aspects, a non-zero warm-up required component may correspond to a phase-locked loop component, which may have one or multiple operational warm-up periods (represented as WU) before overhead bit transmission periods. Additionally, in some aspects, the non-non-zero warm-up-required component may be a receiver component that does not require a warm-up period. Further, in FIGS. 4-12, time increases along the horizontal axis of each frame and each corresponding power waveform.

Furthermore, the operation corresponding to the power waveforms in FIGS. 4-12 is based on several key assumptions. For example, negligible convolutional decoder delay is assumed, as is negligible warm-up time for automatic gain control (AGC) circuits or components and negligible group delay for an optional rake receiver. In some aspects, because a phase-locked loop component may remain on during a power-down interval, no warm-up time may be assumed during or following such an interval.

Figure 4:
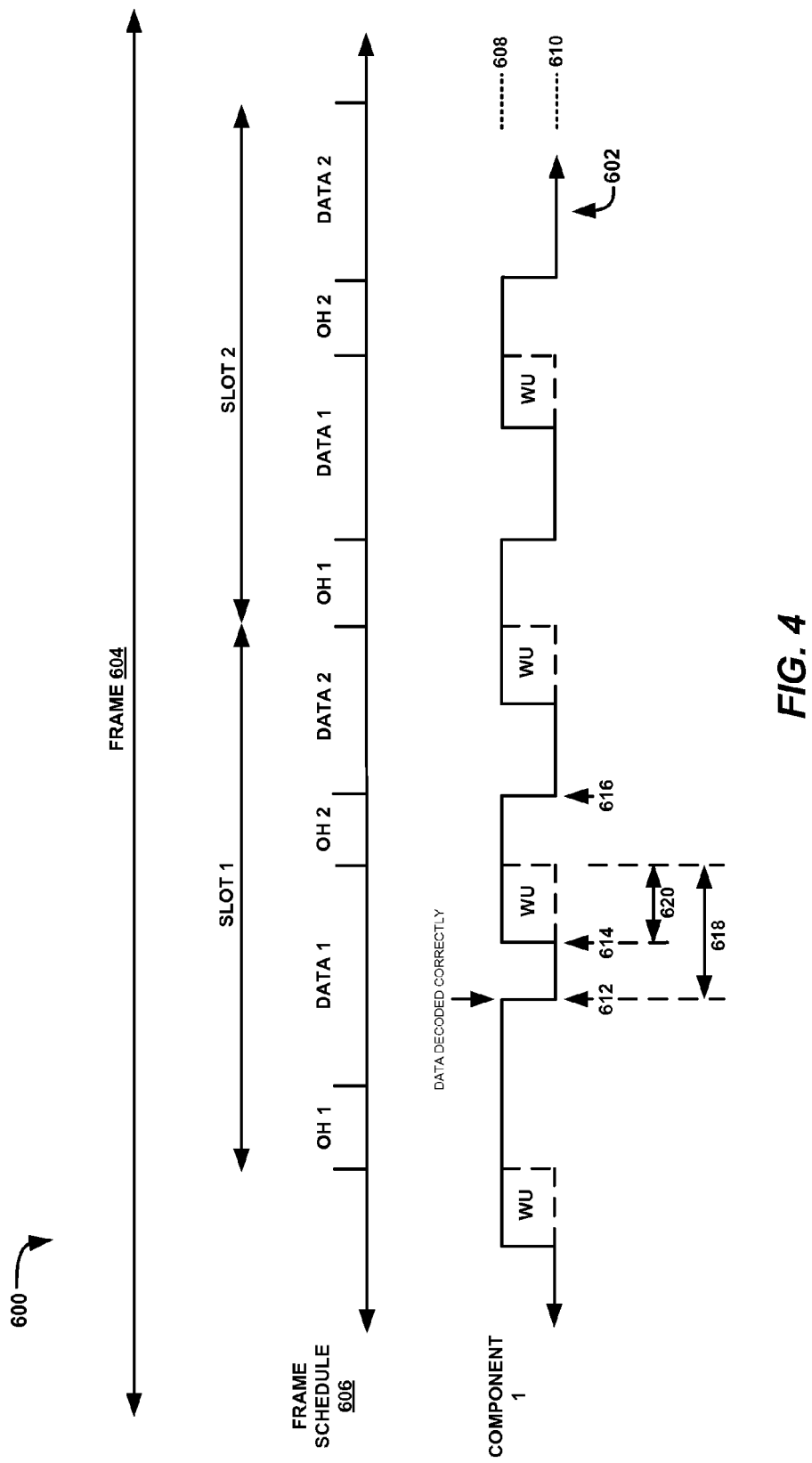
FIG. 4 is an example waveform of a first receiver component according to aspects of the present disclosure.

Turning to FIG. 4, an example of an operational scenario 600 includes a power waveform diagram 602 that illustrates an example operation of a first receiver component, component 1, relative to a frame 604 having frame schedule 606. Operational scenario 600 may include, but is not limited to aspects of method 2 (FIG. 2). For example, at point 612 in sub-period DATA 1, the UE may determine that all payload packet data, which may include all PDU or SDU data but may not include control or overhead data, has been correctly received and decoded (e.g. CRC passes), as in block 22 (FIG. 2), and that the frame is not yet completed, as in block 23 (FIG. 2). Additionally, because the time 618 before the next scheduled overhead bit transmission period, OH 2, is greater than the warm-up period 620 for Component 1, the UE may power down the receiver component until the warm-up period commences at point 614 (e.g. block 27, FIG. 2). Additionally, because the next warm-up period has arrived at point 614, the UE may again power up Component 1. Thereafter, the UE may power down Component 1 after each scheduled overhead bit transmission period because all of the frame data has been correctly received after point 612. Such operation may continue in the same manner with respect to each OH period in the frame and/or subsequent frames.

Figure 5:
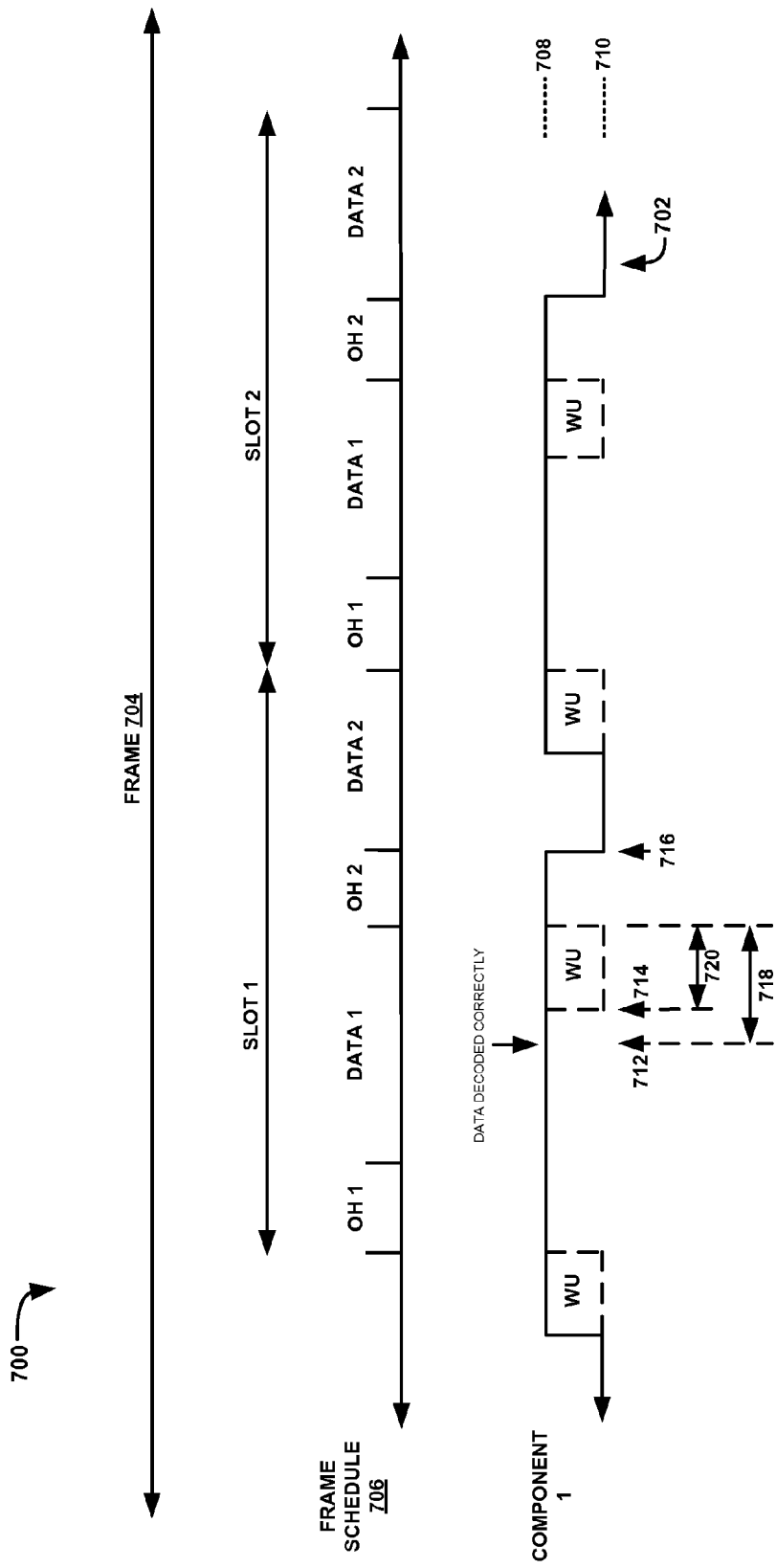
FIG. 5 is an example waveform of a first receiver component according to aspects of the present disclosure.

Turning to FIG. 5, another example of an operational scenario 700 includes a power waveform diagram 702 that illustrates an example operation of a first receiver component, Component 1, relative to a frame 704 having frame schedule 706 according to aspects of the present disclosure. Furthermore, optional scenario 700 includes first time period 718 corresponding to the time until the next scheduled overhead bit transmission period and second time period 720 corresponding to the warm-up period of Component 1. In some aspects, after correct receipt and decoding of all payload packet data, UE may keep Component 1 powered on from the beginning of WU to the receipt of all overhead data in a slot, but may power Component 1 down thereafter. At point 712, for example, the UE may determine that all payload packet data has been correctly received and decoded, but may not power down Component 1 at point 714 because, in this example, the UE will receive all overhead data within the slot before powering down. Therefore, the UE may keep Component 1 powered up until point 716, where the UE will power down Component 1 until a warm-up period WU anticipating overhead data transmission in a new slot (slot 2). Thus, through maintaining power to Component 1 until all overhead data has been received, the UE may minimize the potential for losing overhead data essential for proper control of UE communication with a network. It is also understood that, although the waveforms of FIGS. 4-12 show the UE powering down Component 1 at the moment that all payload packet data is correctly received (see, e.g., points 916, 1024, 1122, 1224, and/or 1424), the UE may alternatively control power to Component 1 to conform to the waveform of FIG. 7 to ensure complete reception of all overhead bits in a slot.

Figure 6:
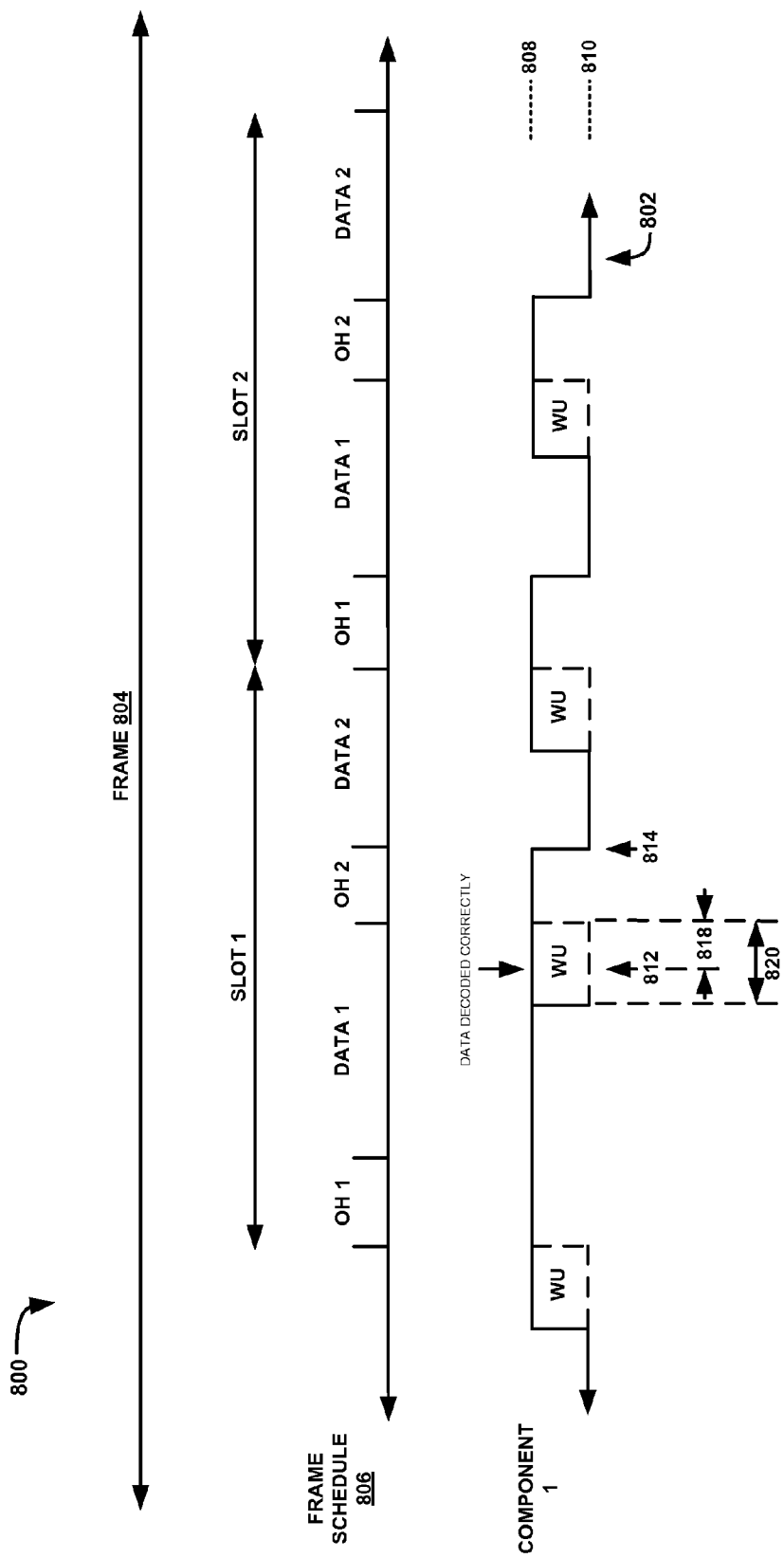
FIG. 6 is an example waveform of a first receiver component according to aspects of the present disclosure.

Turning to FIG. 6, another example of an operational scenario 800 includes a power waveform diagram 802 that illustrates an example operation of a first receiver component, Component 1, relative to a frame 804 having frame schedule 806 according to aspects of the present disclosure. Furthermore, levels 808 and 810 represent voltage levels corresponding to ON and OFF positions, respectively. Furthermore, optional scenario 800 includes first time period 818 corresponding to the time until the next scheduled overhead bit transmission period and second time period 820 corresponding to the warm-up period of Component 1. FIG. 6 illustrates an example operation of a non-zero warm-up-required component according to aspects of the present disclosure, which may include, but is not limited to aspects of method 2 (FIG. 2). For example, the UE may determine at point 812 that all payload packet data has been correctly received and decoded (e.g. CRC passes), as in block 22 (FIG. 2), and that the frame is not yet completed, as in block 23 (FIG. 2). Additionally, the UE may maintain power to Component 1 for receipt of overhead bits during OH 2. Additionally, because all payload packet data has been received as of point 812, the UE may power down Component 1 at point 814 without risking the loss of frame data.

Figure 7:
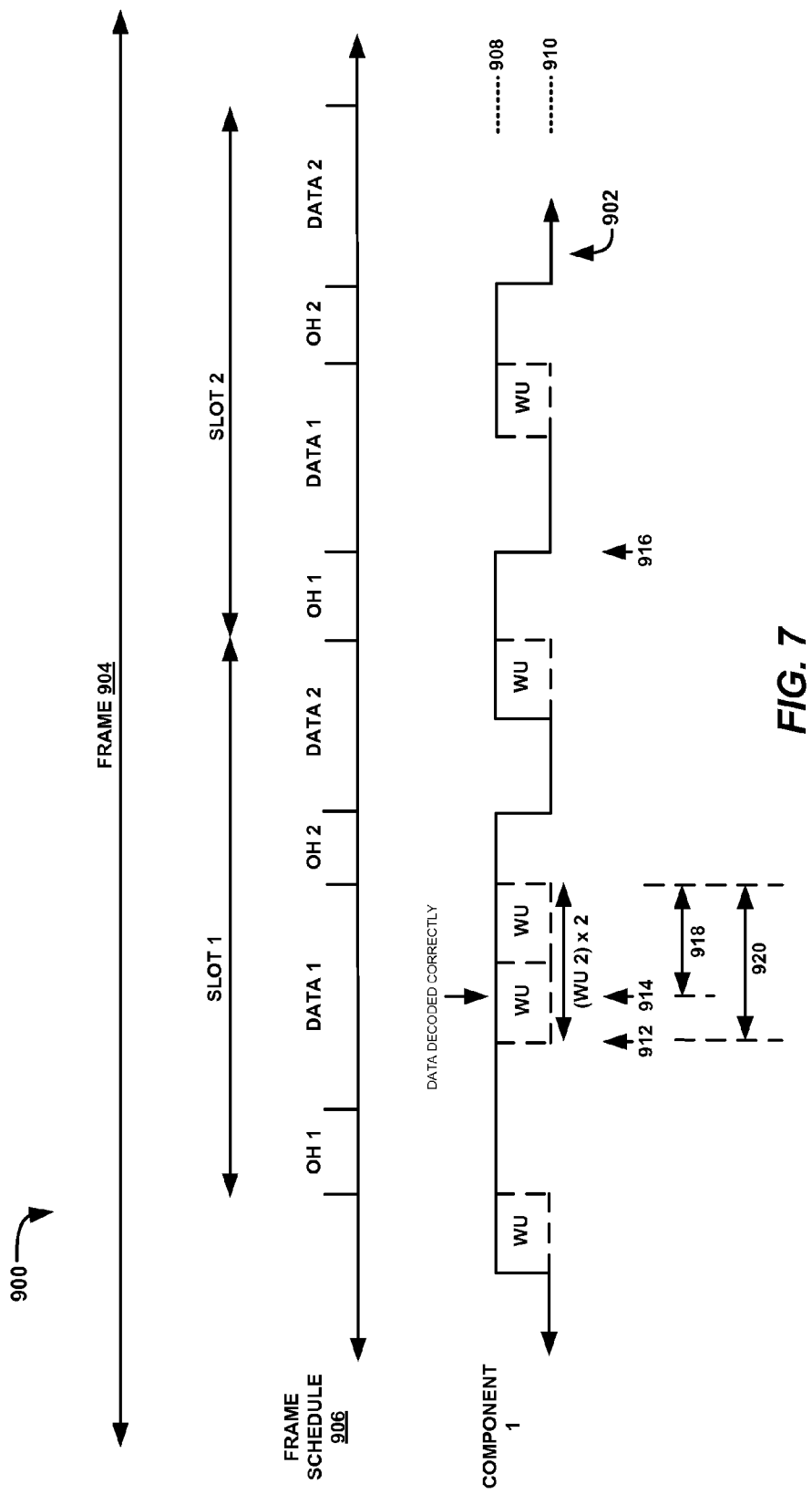
FIG. 7 is an example waveform of a first receiver component according to aspects of the present disclosure.

Additionally, turning to FIG. 7, another example of an operational scenario 900 includes a power waveform diagram 902 that illustrates an example operation of a first receiver component, Component 1, relative to a frame 904 having frame schedule 906 according to aspects of the present disclosure. Furthermore, optional scenario 900 includes first time period 918 corresponding to the time until the next scheduled overhead bit transmission period and second time period 920 corresponding to twice the required component warm-up time period. In addition, levels 908 and 910 represent voltage levels corresponding to ON and OFF positions, respectively. Waveform 902 is example waveform for an example operation where warm-up period for Component 1 is optionally equal to twice the traditional required warm-up period for the component. For example, the UE may determine at point 912 that all payload packet data has been correctly received and decoded (e.g. CRC passes), as in block 22 (FIG. 2). Additionally, the UE may determine that the time period 918 until the next scheduled overhead bit transmission (OH 2) is not greater than twice warm-up period 920 for Component 1 (WU), which begins at point 914. Therefore, there is not time to power down Component 1. Furthermore, though FIG. 7 depicts an example waveform where the second time period 920 is equal to twice the typical warm-up period of Component 1, any multiple of the typical warm-up period may be utilized as the warm-up period, including time periods that are not multiples of the traditional required warm-up period. As such, because the UE may maintain power to Component 1 for receipt of overhead bits during OH 2. Additionally, because all payload packet data has been received as of point 912, the UE may power down Component 1 at point after OH 2 of slot 1 without risking the loss of frame data.

Figure 8:
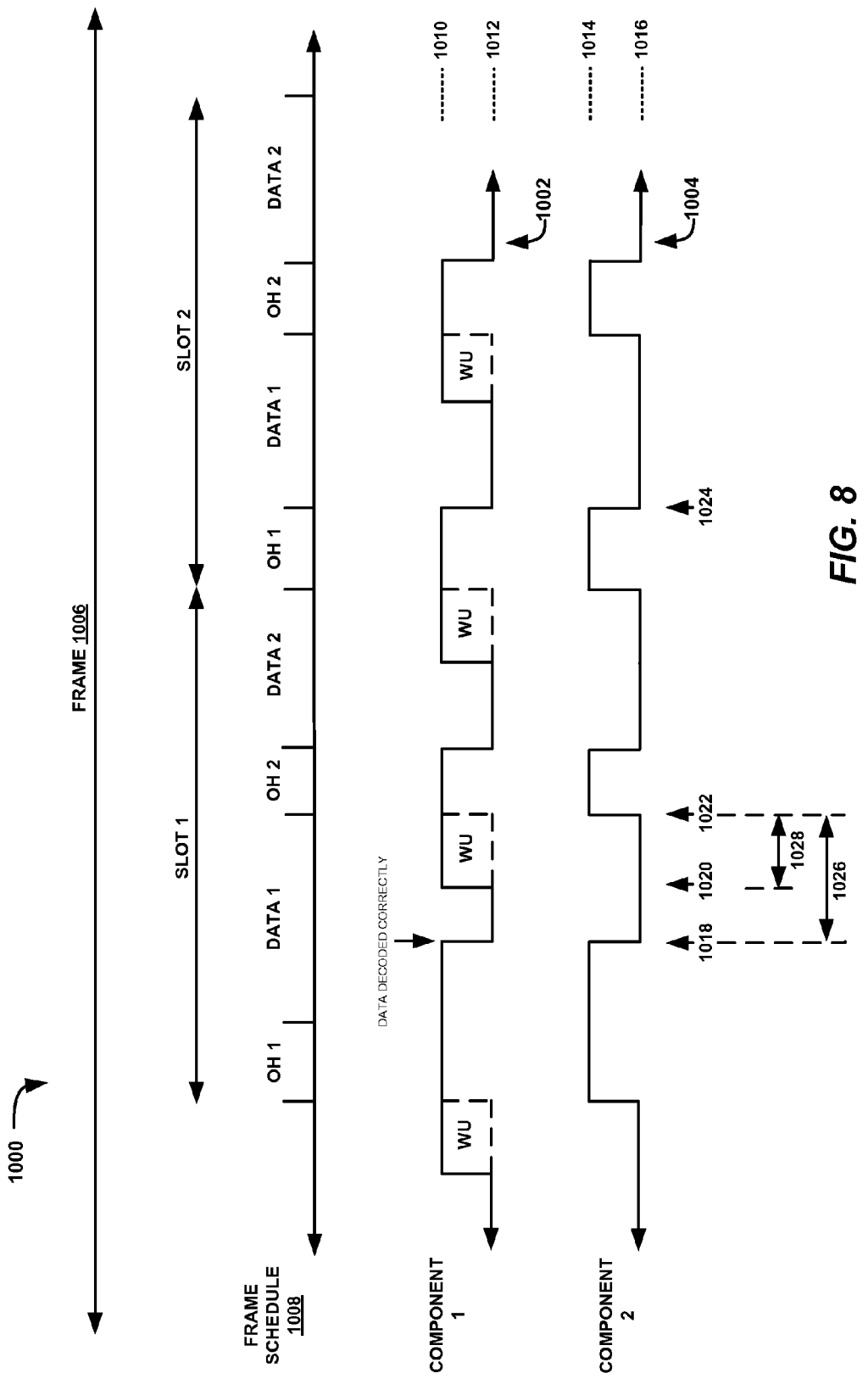
FIG. 8 is an example waveform of first and second receiver components according to aspects of the present disclosure.

Turning to FIG. 8, another example of an operational scenario 1000 includes power waveform diagrams 1002 and 1004 that illustrate example operation of a first receiver component, Component 1 and a second receiver component, Component 2, respectively, relative to a frame 1006 having frame schedule 1008 according to aspects of the present disclosure. Furthermore, optional scenario 1000 includes first time period 1026 corresponding to the time until the next scheduled overhead bit transmission period and second time period 1028 corresponding to the warm-up period of Component 1. In addition, levels 1010 and 1014 represent ON voltage levels corresponding, whereas levels 1012 and 1016 represent OFF positions. According to aspects of FIG. 8, an Component 1 may require a non-negligible warm-up time (WU) and Component 2 may have a substantially negligible warm-up time, and operation thereof may include, but is not limited to, aspects of methods 2 and/or 3 (FIGS. 2 and 3). For example, at point 1018, in sub-period DATA 1, the UE may determine that all payload packet data has been correctly received and decoded (e.g. CRC passes), as in block 22 (FIG. 2), and that the frame is not yet completed, as in block 23 (FIG. 2). Additionally, because the time 1026 until the next scheduled overhead bit transmission period, OH 2, is greater than the warm-up period 1028 for Component 1, the UE may power down Component 1 and Component 2 at point 1018 as at block 27 (FIG. 2). Furthermore, at point 1020, as the beginning of the warm-up period has arrived and the receiver has one or more non-zero warm-up-required component the UE may power up Component 1. Component 2, however, may remain powered off until point 1022 at the start of OH 2, which is the next overhead bit transmission period.

Figure 9:
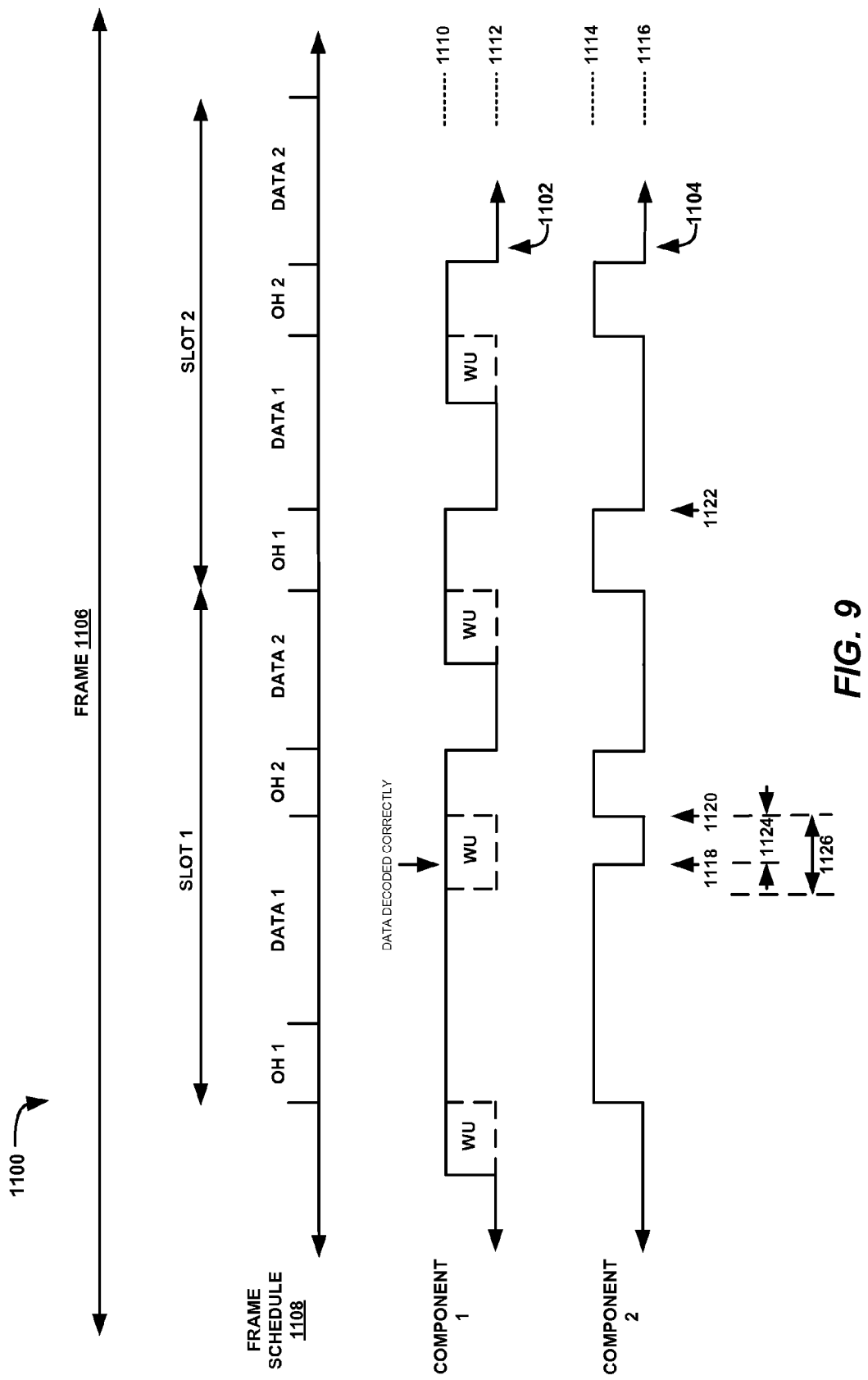
FIG. 9 is an example waveform of first and second receiver components according to aspects of the present disclosure.

Turning to FIG. 9, another example of an operational scenario 1100 includes power waveform diagrams 1102 and 1104 that illustrate example operation of a first receiver component, Component 1 and a second receiver component, Component 2, respectively, relative to a frame 1106 having frame schedule 1108 according to aspects of the present disclosure. Furthermore, optional scenario 1100 includes first time period 1124 corresponding to the time until the next scheduled overhead bit transmission period and second time period 1126 corresponding to the warm-up period of Component 1. Additionally, levels 1110 and 1114 represent ON voltage levels corresponding, whereas levels 1112 and 1116 represent OFF positions.

In an aspect, at point 1118 in sub-period DATA 1, the UE may determine that all payload packet data has been correctly received and decoded (e.g. CRC passes), as in block 22 (FIG. 2). Additionally, because at point 1118 the time period 1126 corresponding to the warm-up period is longer than the time period 1124 to the start of the next scheduled overhead bit transmission period, OH 2, the UE may maintain power to Component 1 for receipt of the overhead bits. Additionally, because the next scheduled overhead bit period does not begin until point 1120, the UE may power down Component 2 at point 1118. Furthermore, at point 1120, the UE may further power up Component 2 at point 1120 as in block 46 of FIG. 47. As such, the UE may save power without risk of missing needed data by powering off Component 2 from point 1118 to point 1120, as all payload packet data has been correctly decoded by point 1118.

Figure 10:
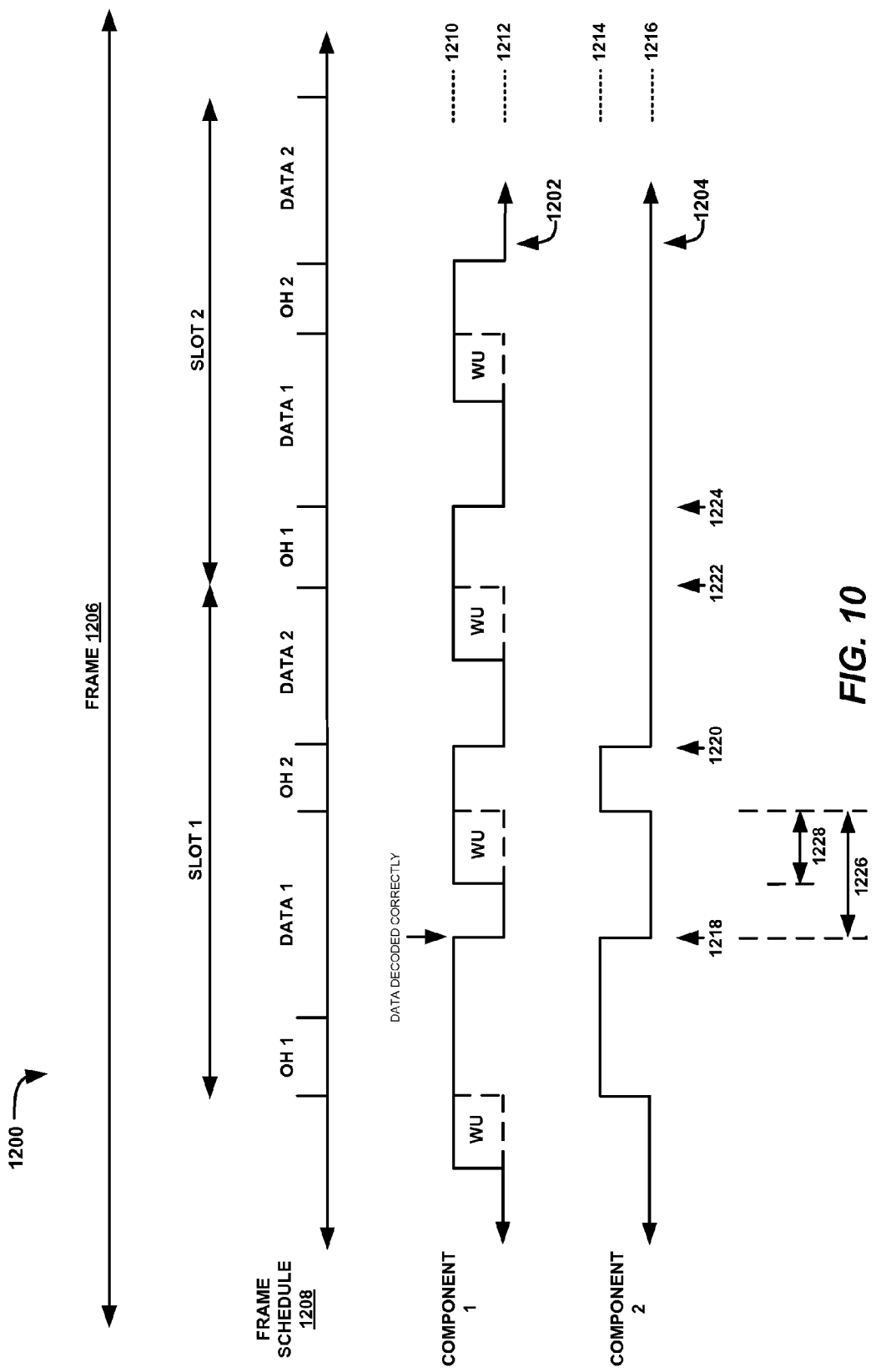
FIG. 10 is an example waveform of first and second receiver components according to aspects of the present disclosure.

Turning to FIG. 10, another example of an operational scenario 1200 includes power waveform diagrams 1202 and 1204 that illustrate example operation of a first receiver component, Component 1 and a second receiver component, Component 2, respectively, relative to a frame 1206 having frame schedule 1208 according to aspects of the present disclosure. Furthermore, optional scenario 1200 includes first time period 1226 corresponding to the time until the next scheduled overhead bit transmission period and second time period 1228 corresponding to the traditional warm-up period of Component 1. In addition, levels 1210 and 1214 represent ON voltage levels corresponding, whereas levels 1212 and 1216 represent OFF positions. According to aspects of FIG. 10, Component 1 may require a non-negligible warm-up time (WU) and Component 2 may have a substantially negligible warm-up time. The waveform of FIG. 10 illustrates an example method wherein the UE maintains power to Component 2 during scheduled overhead bit transmission periods of every nth slot of a frame. For example, in FIG. 10, the waveform may illustrate an example waveform wherein n equals 2, meaning that the UE powers up Component 2 during OH 1 and OH 2 of every other slot. In an example, such a method may be implemented where channel, link, and/or network conditions are particularly reliable. Thus, maintaining power to one component every n slots may save battery power with a relatively low risk of missing overhead data, as Component 1 may continue to receive power during OH 1 and OH 2 of every slot.

With specific reference to FIG. 10, at point 1218, in sub-period DATA 1, the UE may determine that all payload packet data has been correctly received and decoded (e.g. CRC passes), as in block 22 (FIG. 2), and that the frame is not yet completed, as in block 23 (FIG. 2). As a result, the UE may power off Component 1 and Component 2 at point 1218 because there exists time to power down the components before the warm-up or next scheduled overhead bit transmission period. Additionally, at point 1220, the UE may power off both Component 1 and Component 2 because OH 2 has finished and all payload packet data has been received as of point 1218. However, after point 1220, though the waveform of Component 1 may behave according to previous aspects, Component 2 may not be powered on for the remainder of slot 2. For example, whereas in other aspects the UE may power up Component 2 at point 1222, the UE may, in an aspect, detect relatively strong network conditions and not power on Component 2 until, for example slot 3 where n=2, slot 4 where n=3, and so on. In an aspect, n may be a positive integer and/or a fraction of a positive integer, for example, or may be represented by a decimal number. Furthermore, in an additional example, Component 2 may behave according to previous aspects, whereas the UE may power down Component 1 during every n slots. Thus, additional power savings may be realized where a UE powers on a component for overhead data reception for only every n slots.

Figure 11:
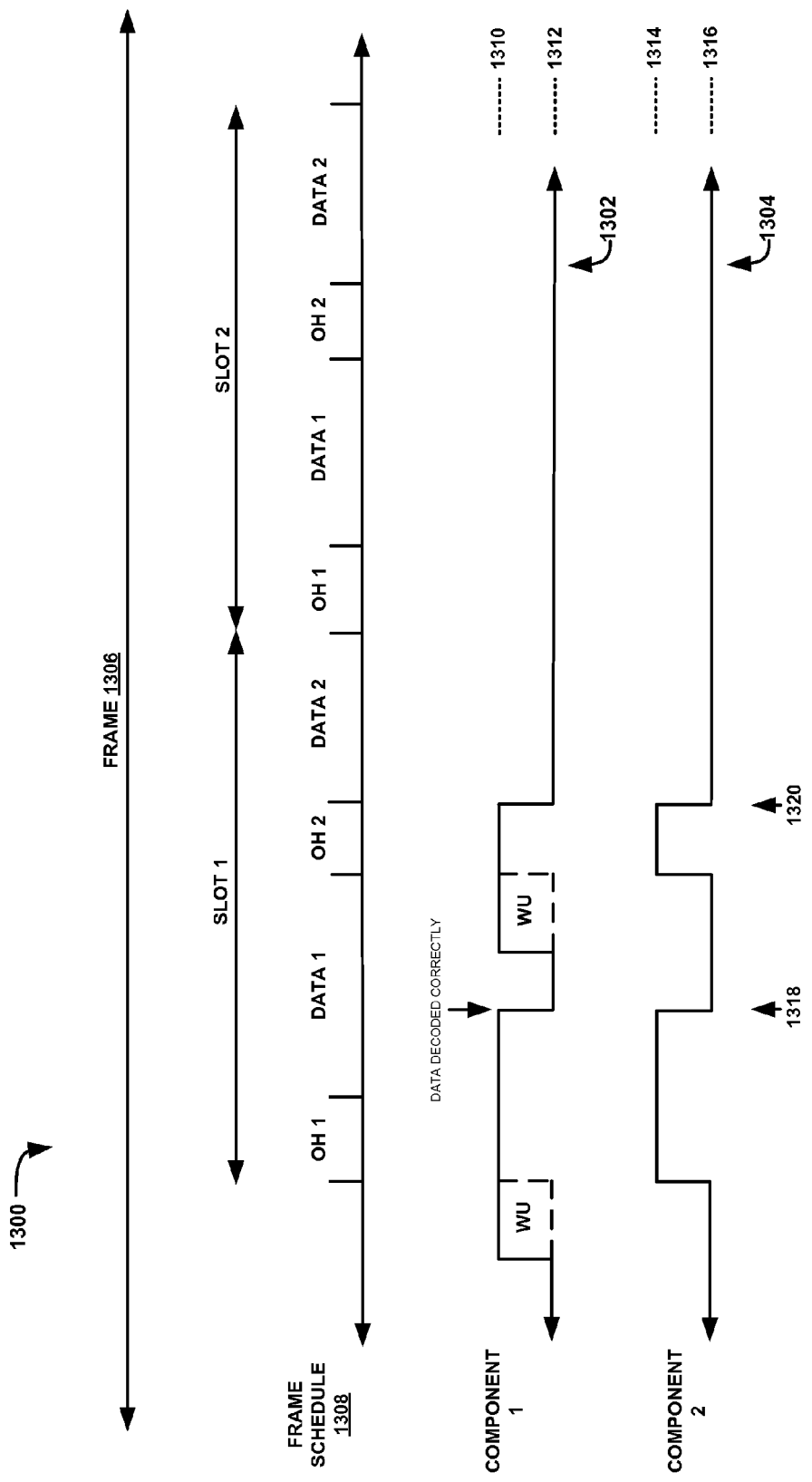
FIG. 11 is an example waveform of first and second receiver components according to aspects of the present disclosure.

Turning to FIG. 11, another example of an operational scenario 1300 includes power waveform diagrams 1302 and 1304 that illustrate example operation of a first receiver component, Component 1 and a second receiver component, Component 2, respectively, relative to a frame 1306 having frame schedule 1308 according to aspects of the present disclosure. Furthermore, levels 1310 and 1314 represent ON voltage levels corresponding, whereas levels 1312 and 1316 represent OFF positions. According to aspects of FIG. 11, Component 1 may require a non-negligible warm-up time (WU) and Component 2 may have a substantially negligible warm-up time. In an aspect, the UE may power up both Component 1 and Component 2 during every n slots. For example, at point 1318, the UE may determine that all payload packet data has been correctly decoded, and may power down both Component 1 and Component 2 until the beginning of a warm-up period and a scheduled overhead bit data period OH 2, respectively. However, after point 1320, the UE may power down both Component 1 and Component 2 during the remainder of slot 1 and for the entirety of the subsequent slot, slot 2. In an aspect, the operation of FIG. 11 may be utilized in relatively strong network conditions where the UE determines that sufficient overhead data may be obtained when receiving such overhead data via Component 1 and Component 2 during every n frames. Thus, in such conditions, additional power savings may be realized by powering down a plurality of components every n slots in a frame.

Figure 12:
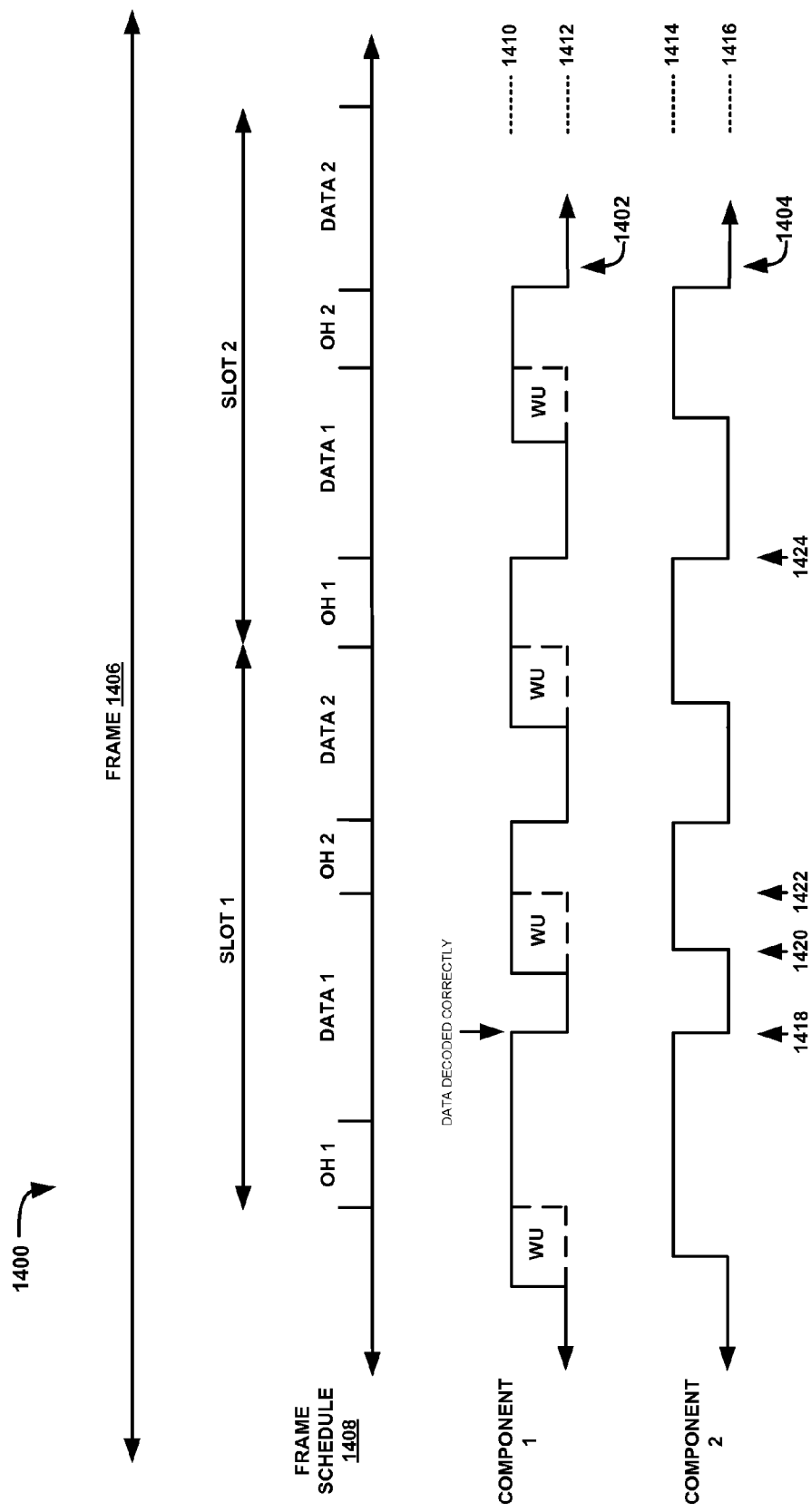
FIG. 12 is an example waveform of first and second receiver components according to aspects of the present disclosure.

Turning to FIG. 12, another example of an operational scenario 1400 includes power waveform diagrams 1402 and 1404 that illustrate example operation of a first receiver component, Component 1 and a second receiver component, Component 2, respectively, relative to a frame 1406 having frame schedule 1408 according to aspects of the present disclosure. Furthermore, levels 1410 and 1414 represent ON voltage levels corresponding, whereas levels 1412 and 1416 represent OFF positions. According to aspects of FIG. 12, Component 1 may require a non-negligible warm-up time (WU) and Component 2 may have a substantially negligible warm-up time. For example, in FIG. 12, a UE may power on a second component before the beginning of one or more scheduled overhead bit transmission periods to ensure that the second component is powered on for the entirety of the scheduled overhead bit transmission periods. Specifically, at point 1418, for example, the UE may determine that all payload packet data has been correctly received and decoded, and therefore may power down both Component 1 and Component 2. Turning to Component 2, whereas the UE in methods described above may have waited to power up Component 2 at point 612C corresponding to the beginning of OH 2, in the method of FIG. 12, the UE may power Component 2 at an earlier point, such as point 1420. By doing so, the UE may further ensure that all overhead data is received during OH 2 and subsequent overhead transmission periods in the frame while saving power, for example, by powering down Component 2 between point 1418 and point 1420.

Figure 13:
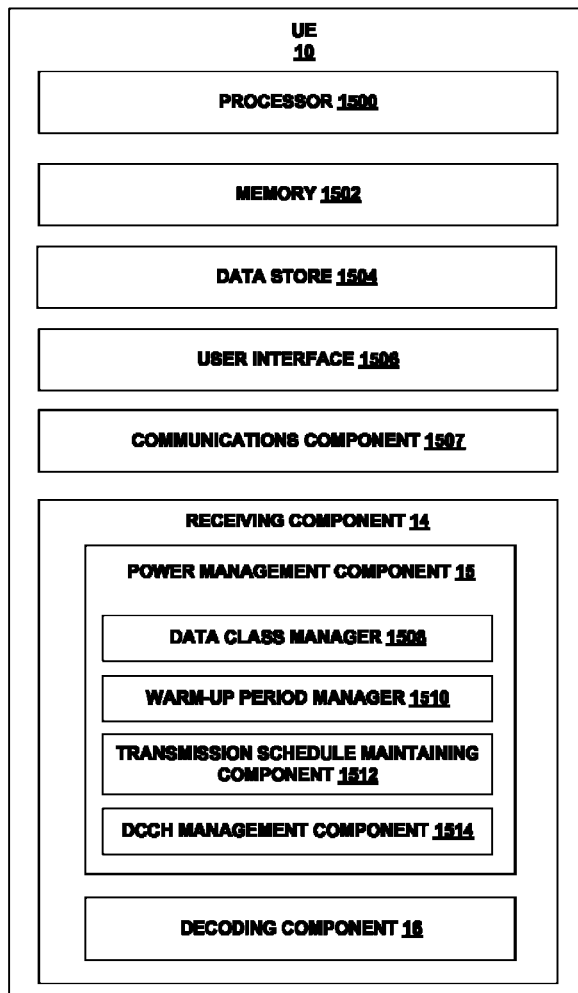
FIG. 13 is a block diagram of aspects of a UE device according to aspects of the present disclosure.

Referring to FIG. 13, in one aspect, UE 10 (FIG. 1) is represented. UE 10 includes a processor 1500 for carrying out processing functions associated with one or more of components and functions described herein. Processor 1500 can include a single or multiple set of processors or multi-core processors. Moreover, processor 1500 can be implemented as an integrated processing system and/or a distributed processing system.

UE 10 further includes a memory 1502, such as for storing data used herein and/or local versions of applications being executed by processor 1500. Memory 1502 can include any type of memory usable by a computer, such as random access memory (RAM), read only memory (ROM), tapes, magnetic discs, optical discs, volatile memory, non-volatile memory, and any combination thereof.

Additionally, UE 10 may further include a data store 1504, which can be any suitable combination of hardware and/or software, that provides for mass storage of information, databases, and programs employed in connection with aspects described herein. For example, data store 1504 may be a data repository for applications not currently being executed by processor 1500.

UE 10 may additionally include a user interface component 1506 operable to receive inputs from a user of UE 10, and further operable to generate outputs for presentation to the user. User interface component 1506 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 1506 may include one or more output devices, including but not limited to a display, a speaker, a haptic feedback mechanism, a printer, any other mechanism capable of presenting an output to a user, or any combination thereof.

Further, UE 10 includes a communications component 1507 that provides for establishing and maintaining communications with one or more parties utilizing hardware, software, and services as described herein. Communications component 1507 may carry communications between components on UE 10, as well as between UE 10 and external devices, such as devices located across a communications network and/or devices serially or locally connected to UE 10, for example, network entity 11 (FIG. 1). For example, UE 10 may include one or more buses, and may further include transmit chain components and receive chain components associated with a transmitter and receiver, respectively, operable for interfacing with external devices.

Additionally, UE 10 may include a receiving component 14 that may receive one or more signals containing data, such as frame data and/or overhead or control data from, for example, a network entity 11. In some aspects, receiving component 14 may be configured to perform some or all of the method steps of the methods corresponding to FIGS. 2 AND 3. In a further aspect, receiving component 14 may be a receiver, transceiver, or any other electrical component and/or circuitry capable of receiving and/or processing electromagnetic signals.

Furthermore, receiving component 14 may contain power management component 15 configured to manage power to one or more receiver components. Power management component may contain a data class manager 1508, which may be configured to recognize the receipt of certain classes of data and base a decision to power up or power down one or more receiver components based on the correct receipt of one or more classes of data in a frame. In an aspect, such classes of data may include classes A, B, and C data of AMR 12.2 k standard voice data.

Additionally, power management component 15 may include a warm-up period manager 1510, which may be configured to store information pertaining to the required warm-up periods of one or more receiver components in UE 10. Also, power management component 15 may contain a transmission schedule maintaining component 1512, which may be configured to receive and/or store a transmission schedule for a particular communication standard, such as a communication standard being utilized for communication with one or more network entities 11. Furthermore, power management component 15 may include a DCCH management component 1514 configured to determine whether a DCCH condition is present. For example, in some aspects, DCCH management component 1514 may determine a threshold DCCH energy value and/or an accumulated DCCH energy value. In addition, DCCH management component 1514 may compare the threshold DCCH energy value to the accumulated DCCH energy value and make a determination regarding the presence of a DCCH therefrom. In an additional aspect, receiving component 14 may include a decoding component 16 for decoding received data, such as frame data (e.g. PDU and/or SDU data) and overhead or control data.

Figure 14:
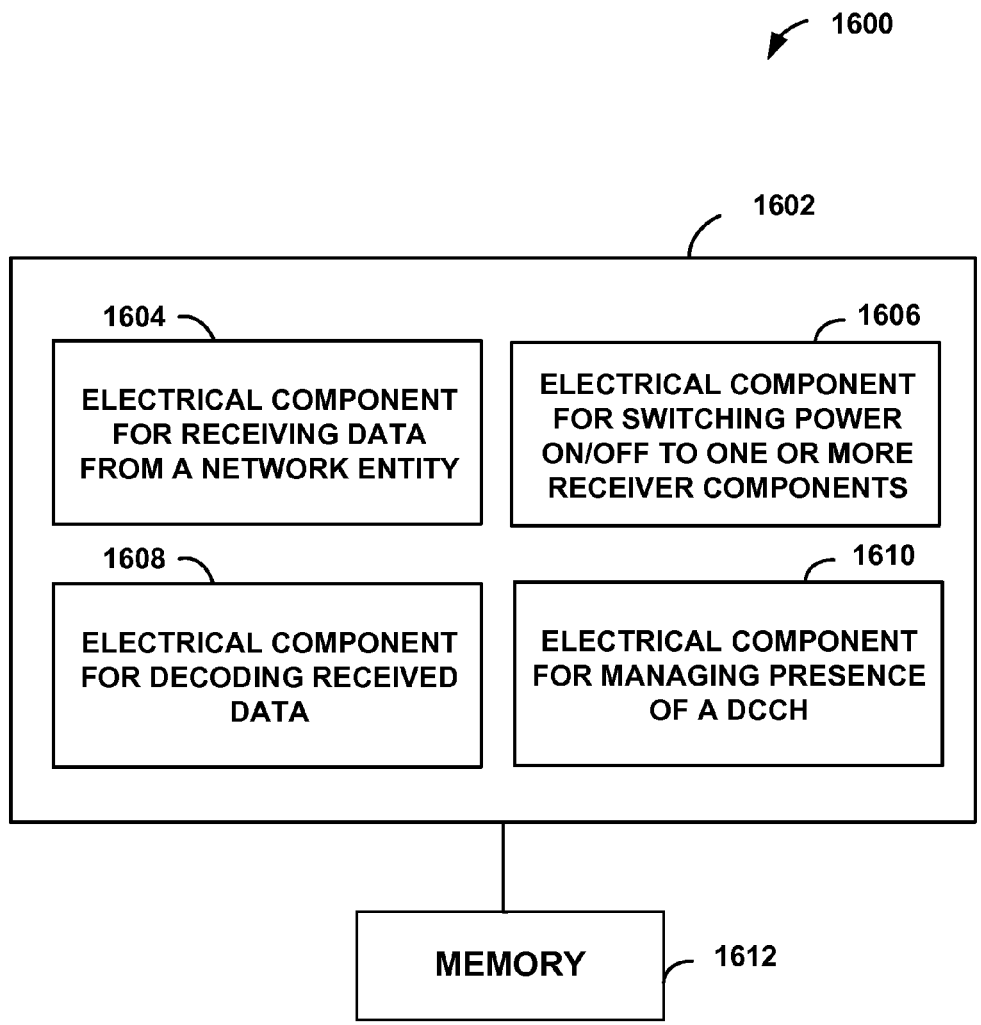
FIG. 14 is a component diagram of a logical grouping illustrating aspects of the present disclosure.
Figure 15:
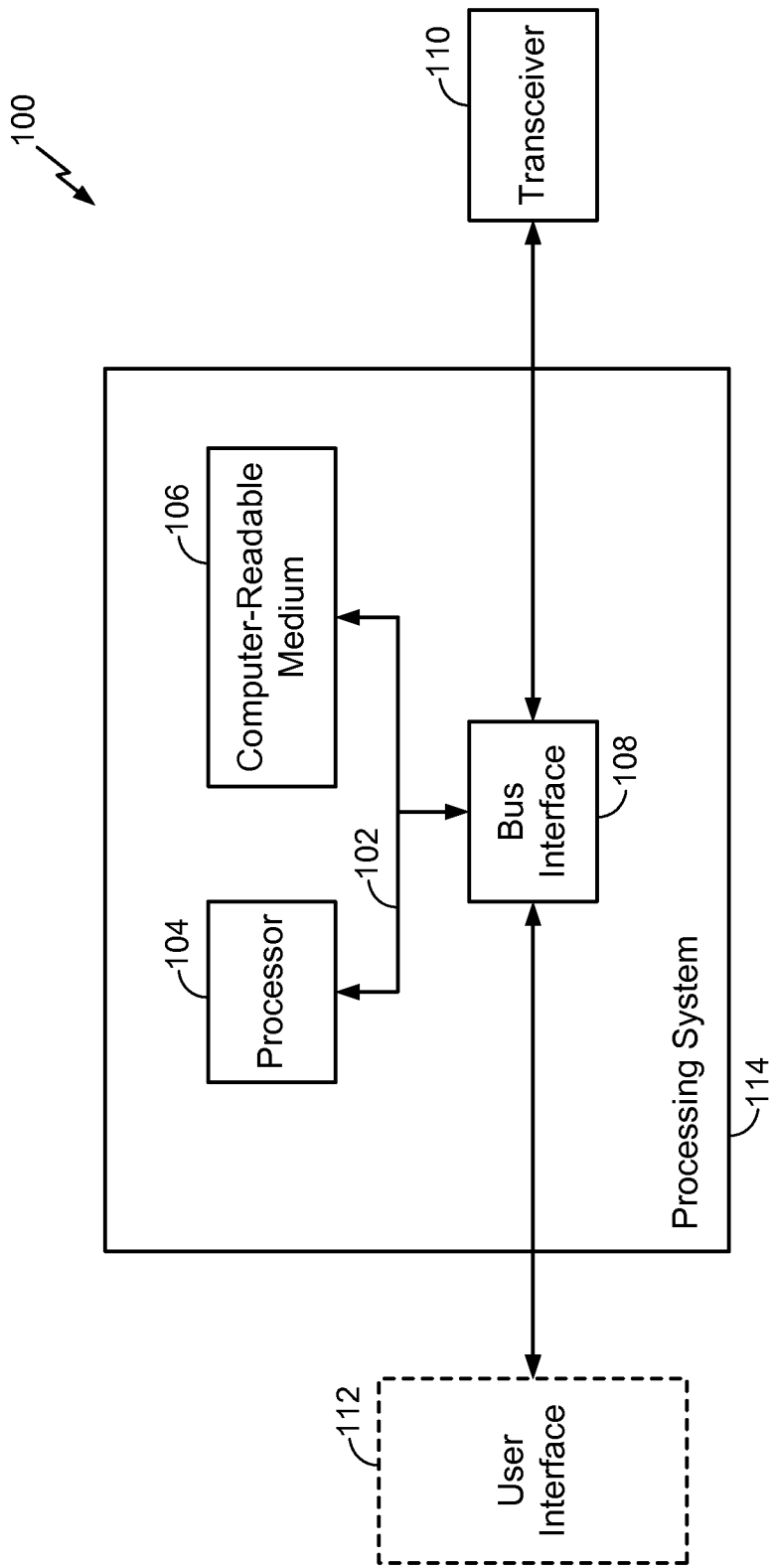
FIG. 15 is a block diagram illustrating an example of a hardware implementation for an apparatus employing a processing system.

Referring to FIG. 14, an example system 1600 is displayed for selectively powering on and powering off one or more receiver components for UE power savings. For example, system 1600 can reside at least partially within a device, such as UE 10. It is to be appreciated that system 1600 is represented as including functional blocks, which can be functional blocks that represent functions implemented by a processor, software, or combination thereof (e.g., firmware). System 1600 includes a logical grouping 1602 of electrical components that can act in conjunction. For example, logical grouping 1602 can include an electrical component 1604 for receiving data from a network entity. In an example, electrical component 1604 may be receiving component 14 (FIGS. 1 and 15), and may be configured to receive frame data (e.g. PDU and/or SDU data) and overhead or control data. Additionally, logical grouping 1602 can include an electrical component 1606 for switching power on or off to one or more receiver components. In an example, electrical component 1606 may be power management component 15 (FIGS. 1 and 15). Furthermore, logical grouping 1602 can include an electrical component 1608 for decoding received data. In an example, electrical component 1606 may be decoding component 16 (FIGS. 1 and 15). Optionally, in an additional aspect, logical grouping 1602 can include an electrical component 1610 for detecting and/or managing the presence of a DCCH. In an example, electrical component 1610 may be DCCH management component 1514 (FIG. 13). In a further optional aspect, where a DCCH is present, DCCH management component 1514 may cancel any potential early power-off of receiver components.

Additionally, system 1600 can include a memory 1612 that retains instructions for executing functions associated with the electrical components 1604, 1606, 1608, and 1610, stores data used or obtained by the electrical components 1604, 1606, 1608, and 1610, etc. While shown as being external to memory 1612, it is to be understood that one or more of the electrical components 1604, 1606, 1608, and 1610 can exist within memory 1612. In one example, electrical components 1604, 1606, 1608, and 1610 can comprise at least one processor, or each electrical component 1604, 1606, 1608, and 1610 can be a corresponding module of at least one processor. Moreover, in an additional or alternative example, electrical components 1604, 1606, 1608, and 1610 can be a computer program product including a computer readable medium, where each electrical component 1604, 1606, 1608, and 1610 can be corresponding code.

FIG. 15 is a block diagram illustrating an example of a hardware implementation for an apparatus 100 employing a processing system 114. In an aspect, apparatus 100 and/or processing system 114 may include receiving component 14 (FIGS. 1 and 15) and/or power management component 15 (FIGS. 1 and 15). In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 16:
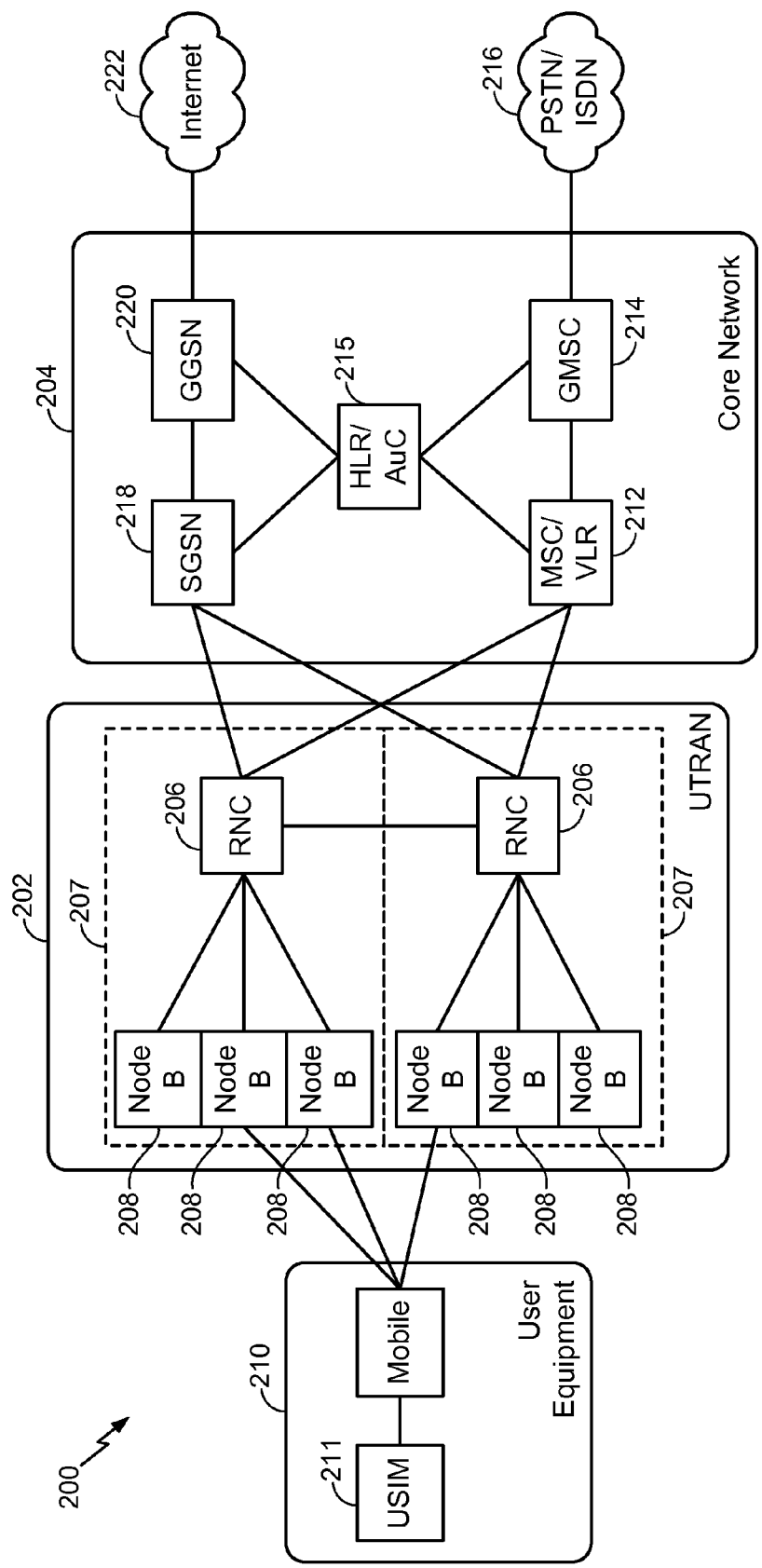
FIG. 16 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 16 are presented with reference to a UMTS system 200 employing a W-CDMA air interface. UMTS system 200 may, for example, be wireless environment 1 of FIG. 1, and may include one or more network entities 11 (FIG. 1) and/or one or more UEs 10 (FIG. 1), which may perform one or more of the methods for optimizing battery power as illustrated in FIGS. 2 AND 3. A UMTS network includes three interacting domains: a Core Network (CN) 204, a UMTS Terrestrial Radio Access Network (UTRAN) 202, and User Equipment (UE) 210. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v 9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 17:
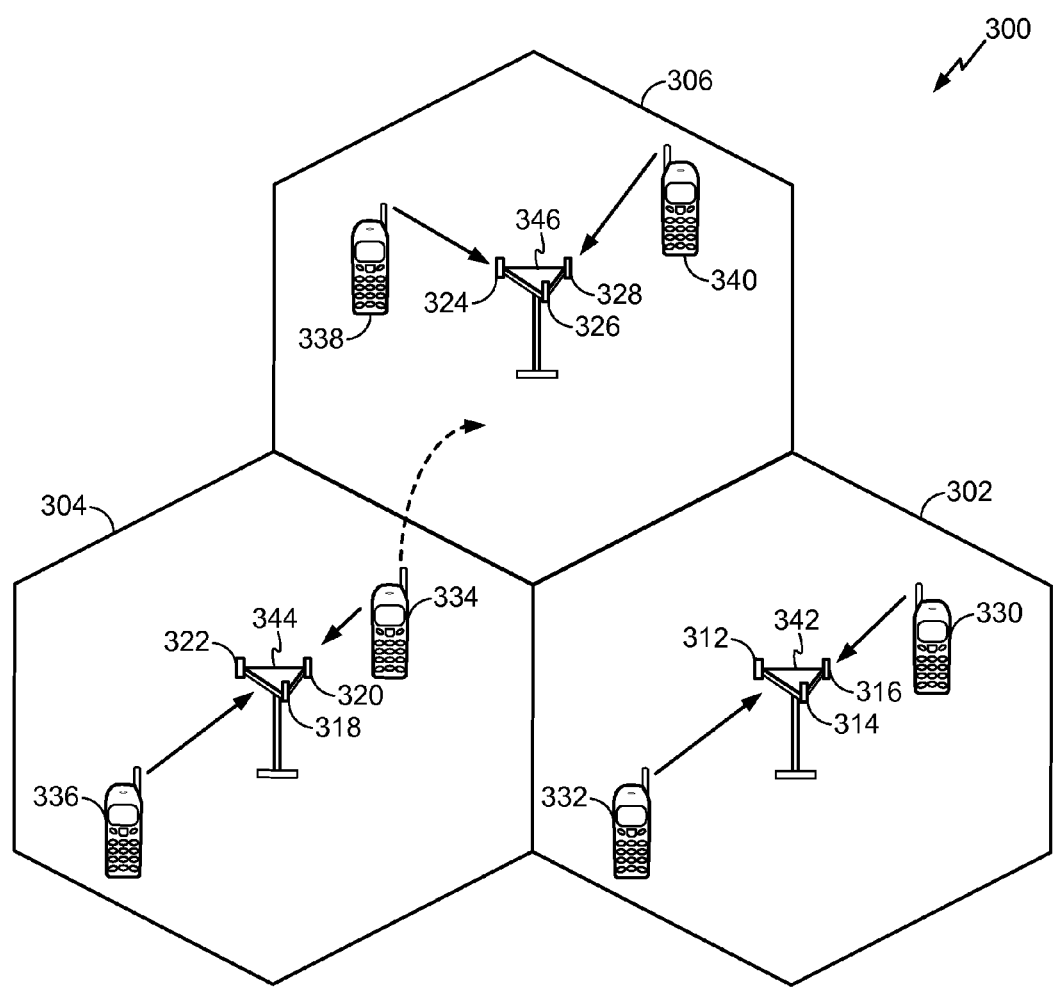
FIG. 17 is a conceptual diagram illustrating an example of an access network.

Referring to FIG. 17, an access network 300 in a UTRAN architecture is illustrated. In an aspect, access network 300 may, for example, be wireless environment 1 of FIG. 1, and may include one or more network entities 11 (FIG. 1) and/or one or more UEs 10 (FIG. 1), which may perform one or more of the methods for optimizing battery power as illustrated in FIGS. 2 AND 3. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 2) for all the UEs 330, 332, 334, 336, 338, 340 in the respective cells 302, 304, and 306.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 13), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 18:
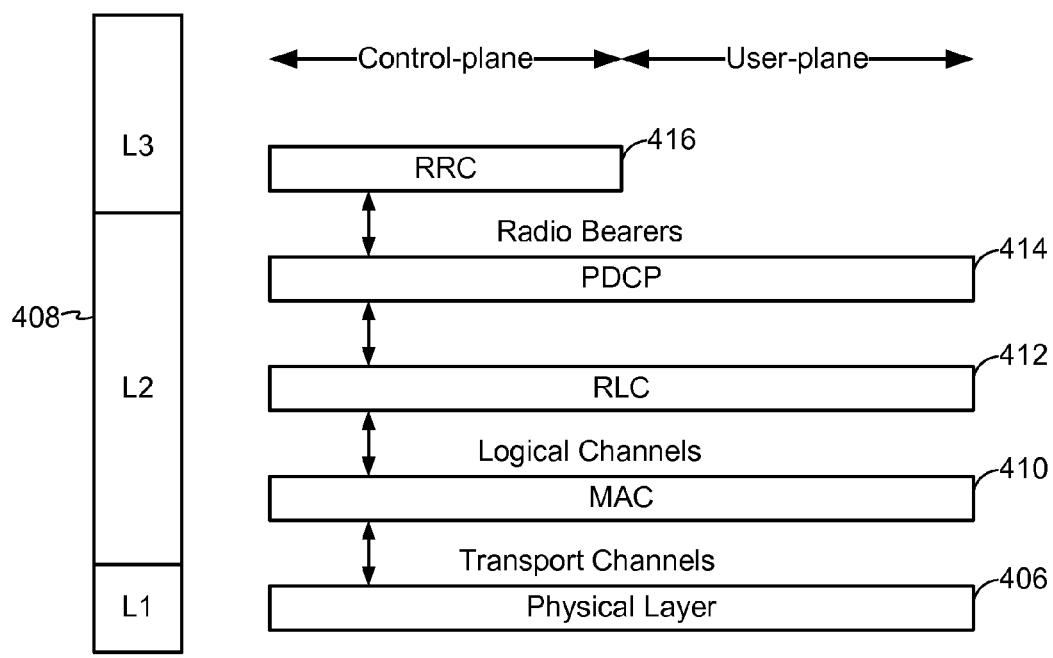
FIG. 18 is a conceptual diagram illustrating an example of a radio protocol architecture for the user and control plane.

The radio protocol architecture may take on various forms depending on the particular application. An example for an HSPA system will now be presented with reference to FIG. 18. FIG. 18 is a conceptual diagram illustrating an example of the radio protocol architecture for the user and control planes.

Turning to FIG. 18, the radio protocol architecture for the UE and node B is shown with three layers: Layer 1, Layer 2, and Layer 3. This radio protocol architecture may, for example, be utilized in wireless environment 1 of FIG. 1, and may include communication between one or more network entities 11 (FIG. 1) and one or more UEs 10 (FIG. 1), and may serve as the protocol architecture present in communication 12 (FIG. 1) to perform one or more of the methods for optimizing battery power as illustrated in FIGS. 2 AND 3. Layer 1 is the lowest lower and implements various physical layer signal processing functions. Layer 1 will be referred to herein as the physical layer 406. Layer 2 (L2 layer) 408 is above the physical layer 406 and is responsible for the link between the UE and node B over the physical layer 406.

In the user plane, the L2 layer 408 includes a media access control (MAC) sublayer 410, a radio link control (RLC) sublayer 412, and a packet data convergence protocol (PDCP) 414 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between node Bs. The RLC sublayer 412 provides segmentation and reassembly of upper layer data packets, retransmission of lost data packets, and reordering of data packets to compensate for out-of-order reception due to hybrid automatic repeat request (HARQ). The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations.

Figure 19:
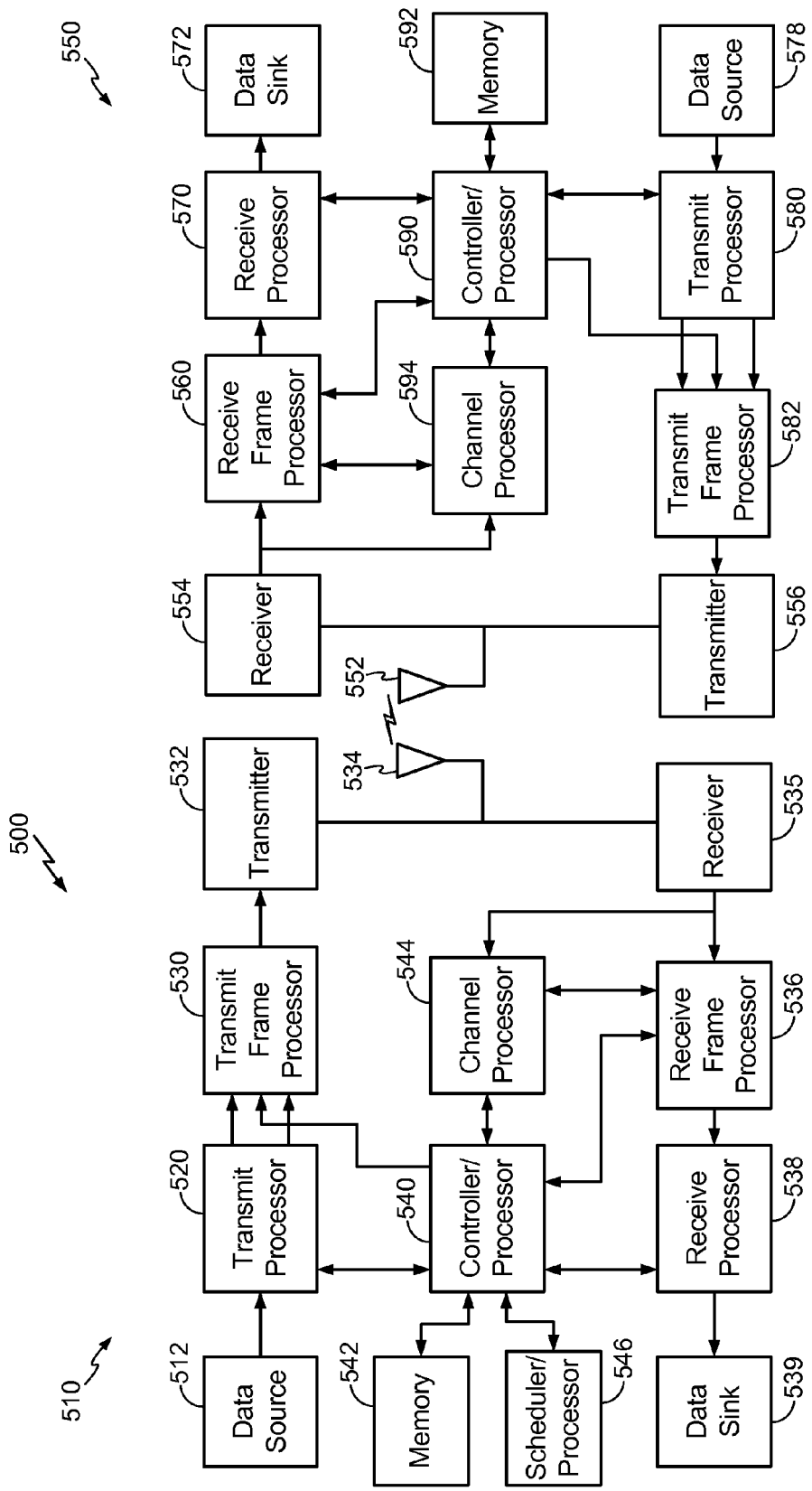
FIG. 19 is a block diagram conceptually illustrating an example of a Node B in communication with a UE in a telecommunications system.

FIG. 19 is a block diagram of a communication environment 500, which may include Node B 510 in communication with a UE 550, where the Node B 510 may be the Node B 208 in FIG. 16 and/or network entity 11 of FIG. 1, and the UE 550 may be the UE 10 in FIGS. 1 and/or 13. Communication environment 500 may, for example, be wireless environment 1 of FIG. 1, and may include one or more network entities 11 (FIG. 1) and/or one or more UEs 10 (FIG. 1), which may perform one or more of the methods for optimizing battery power as illustrated in FIGS. 2 AND 3. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of saving power in a wireless device, comprising:
   receiving data within a frame at a user equipment (UE);
   determining that the data has been correctly decoded prior to an end of the frame; and
   powering down a receiver component of the UE for a portion of a remainder of the frame in response to determining that the data has been correctly decoded and upon a determination that a first time period to a next scheduled overhead bit transmission period of a slot in the frame is greater than a second time period of the slot in the frame corresponding to a warm-up period for the receiver component.

2. The method of claim 1, further comprising maintaining power to the receiver component where the first time period is not greater than the second time period.

3. The method of claim 1, further comprising powering up the receiver component at a first instance prior to the next scheduled overhead bit transmission period, wherein the first instance prior to the next scheduled overhead bit transmission period corresponds to a start of the warm-up period.

4. The method of claim 3, wherein the powering up occurs once every n slots, and wherein n is a positive integer.

5. The method of claim 1, wherein the UE comprises a plurality of receiver components, the method further comprising:
   powering up a first component of the plurality of receiver components at a first instance prior to the next scheduled overhead bit transmission period, wherein the first instance prior to the next scheduled overhead bit transmission period corresponds to a start of a warm-up time for the first component; and
   powering up a second component of the plurality of receiver components substantially at a start of the next scheduled overhead bit transmission period.

6. The method of claim 5, wherein the first component comprises a phase-locked loop receiving component.

7. The method of claim 1, wherein the UE comprises a plurality of receiver components, the method further comprising:
   maintaining power to a first component of the plurality of receiver components where the first time period is not greater than a third time period corresponding to a warm-up period for the first receiver component;
   powering down a second component of the plurality of receiver components where the next scheduled overhead bit transmission period has not yet arrived; and
   powering up the second component substantially at a start of the next scheduled overhead bit transmission period.

8. The method of claim 7, wherein the first component comprises a phase-locked loop receiver component.

9. The method of claim 1, further comprising:
   obtaining a threshold dedicated control channel (DCCH) energy value corresponding to a presence of a DCCH, wherein determining that the data has been correctly decoded occurs at a time interval prior to an end of the frame;
   computing an accumulated DCCH energy value in the frame over the time interval; and canceling the powering down of the receiver component where the accumulated DCCH energy value is greater than or equal to the threshold DCCH energy value.

10. The method of claim 1, further comprising:
determining that the data comprises first class data having an error detection mechanism and second class data without an error detection mechanism;
determining that the first class data has been correctly decoded based on the error detection mechanism; and
assuming that the second class data has been correctly decoded based on determining that the first class data has been correctly decoded, wherein powering down the receiver component for the portion of the remainder of the frame is in response to the determining that the first class data has been correctly decoded.

11. The method of claim 10, wherein the data comprises data encoded with an Adaptive Multi-Rate (AMR) codec, and wherein the first class data comprises class A data and the second class data comprises class B or class C data.

12. The method of claim 1, wherein determining that the data has been correctly decoded further comprises determining that Null and SID data has been correctly decoded.

13. The method of claim 1, wherein determining that the data has been correctly decoded comprises determining that the data has passed a Cyclic Redundancy Check.

14. An apparatus for wireless communication, comprising:
means for receiving data within a frame at a user equipment (UE);
means for determining that the data has been correctly decoded prior to an end of the frame; and
means for powering down a receiver component of the UE for a portion of a remainder of the frame in response to the means for determining making a determination that the data has been correctly decoded and upon a determination that a first time period to a next scheduled overhead bit transmission period of a slot in the frame is greater than a second time period of the slot in the frame corresponding to a warm-up period for the receiver component.

15. A non-transitory computer-readable medium storing instructions that when executed by a computer cause the computer to:
receive data within a frame at a user equipment (UE);
determine that the data has been correctly decoded prior to an end of the frame; and
power down a receiver component of the UE for a portion of a remainder of the frame in response to determining that the data has been correctly decoded and upon a determination that a first time period to a next scheduled overhead bit transmission period of a slot in the frame is greater than a second time period of the slot in the frame corresponding to a warm-up period for the receiver component.

16. An apparatus for wireless communication, comprising:
at least one processor; and
a memory coupled to the at least one processor, wherein the at least one processor is configured to:
receive data within a frame at a user equipment (UE);
determine that the data has been correctly decoded prior to an end of the frame; and
power down a receiver component of the UE for a portion of a remainder of the frame in response to determining that the data has been correctly decoded and upon a determination that a first time period to a next scheduled overhead bit transmission period of a slot in the frame is greater than a second time period of the slot in the frame corresponding to a warm-up period for the receiver component.

17. The apparatus of claim 16, wherein the at least one processor is configured to maintain power to the receiver component where the first time period is not greater than the second time period.

18. The apparatus of claim 16, wherein the at least one processor is configured to power up the receiver component at a first instance prior to the next scheduled overhead bit transmission period, wherein the first instance prior to the next scheduled overhead bit transmission period corresponds to a start of the warm-up period.

19. The apparatus of claim 18, wherein the at least one processor is configured to power up the receiver component once every n slots.

20. The apparatus of claim 16, wherein the UE comprises a plurality of receiver components, and wherein the at least one processor is further configured to:
power up a first component of the plurality of receiver components at a first instance prior to the next scheduled overhead bit transmission period, wherein the first instance prior to the next scheduled overhead bit transmission period corresponds to a start of a warm-up time for the first component; and
power up a second component of the plurality of receiver components substantially at a start of the next scheduled overhead bit transmission period.

21. The apparatus of claim 16, wherein the first component comprises a phase-locked loop receiving component.

22. The apparatus of claim 16, wherein the UE comprises a plurality of receiver components, and wherein the at least one processor is further configured to:
maintain power to a first component of the plurality of receiver components where the first time period is not greater than a third time period corresponding to a warm-up period for the first receiver component;
power down a second component of the plurality of receiver components where the next scheduled overhead bit transmission period has not yet arrived; and
power up the second component substantially at a start of the next scheduled overhead bit transmission period.

23. The apparatus of claim 22, wherein the first component comprises a phase-locked loop receiver component.

24. The apparatus of claim 16, wherein the at least one processor is further configured to:
obtain a threshold dedicated control channel (DCCH) energy value corresponding to a presence of a DCCH, wherein determining that the data has been correctly decoded occurs at a time interval prior to an end of the frame;
compute an accumulated DCCH energy value in the frame over the time interval; and
cancel the powering down of the receiver component where the accumulated DCCH energy value is greater than or equal to the threshold DCCH energy value.

25. The apparatus of claim 16, wherein the at least one processor is further configured to:
determine that the data comprises first class data having an error detection mechanism and second class data without an error detection mechanism;
determine that the first class data has been correctly decoded based on the error detection mechanism; and
assume that the second class data has been correctly decoded based on determining that the first class data has been correctly decoded, wherein powering down the receiver component for the portion of the remainder of the frame is in response to the determining that the first class data has been correctly decoded.

26. The apparatus of claim 25, wherein the data comprises data encoded with an Adaptive Multi-Rate (AMR) codec, and wherein the first class data comprises class A data and the second class data comprises class B or class C data.

27. The apparatus of claim 16, wherein determining that thet data has been correctly decoded further comprises determining that Null and SID data has been correctly decoded.

28. The apparatus of claim 16, wherein determining that the data has been correctly decoded comprises determining that the data has passed a Cyclic Redundancy Check.

* * * * *